US012563244B2

(12) United States Patent
Ding et al.

(10) Patent No.: US 12,563,244 B2
(45) Date of Patent: Feb. 24, 2026

(54) VIDEO TRANSMISSION METHOD AND APPARATUS

(71) Applicant: HUAWEI TECHNOLOGIES CO., LTD., Guangdong (CN)

(72) Inventors: Meiling Ding, Shanghai (CN); Chuteng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/798,853

(22) Filed: Aug. 9, 2024

(65) Prior Publication Data

US 2024/0406468 A1      Dec. 5, 2024

Related U.S. Application Data

(63) Continuation      of      application      No. PCT/CN2022/135123, filed on Nov. 29, 2022.

(30) Foreign Application Priority Data

Feb. 10, 2022      (CN) .......................... 202210125618.5

(51) Int. Cl.
*H04N 21/234*          (2011.01)
*H04N 21/235*          (2011.01)

(52) U.S. Cl.
CPC ... *H04N 21/23418* (2013.01); *H04N 21/2353* (2013.01)

(58) Field of Classification Search
CPC ........... H04N 19/107; H04N 21/21805; H04N 21/2187; H04N 21/23418; H04N 21/234345; H04N 21/2353; H04N 21/2402; H04N 21/262; H04N 21/2743; H04N 21/647; H04N 7/181
See application file for complete search history.

(56) References Cited

U.S. PATENT DOCUMENTS

| | | | |
|---|---|---|---|
| 10,193,955 B2 | 1/2019 | Leroux et al. | |
| 12,225,249 B2 | 2/2025 | Mao | |

(Continued)

FOREIGN PATENT DOCUMENTS

| | | |
|---|---|---|
| CN | 111787292 A | 10/2020 |
| CN | 112203100 A | 1/2021 |

(Continued)

OTHER PUBLICATIONS

Erik Westerberg, Matteo Fiorani, "The innovation potential of Non Real-time RAN Intelligent Controller", Ericsson, Oct. 21, 2020, total 10 pages.

*Primary Examiner* — Boubacar Abdou Tchoussou

(57)          ABSTRACT

This application provides a video transmission method and apparatus, and pertains to the field of network technologies. In this application, after procedures such as obtaining positions of I-frames of videos, arranging the positions of the I-frames, and indicating a video capturing device management platform to adjust a position of an I-frame of a video are performed, the I-frames of the videos are staggered at a radio air interface, helping resolve a problem that I-frames of videos collide, and reduce demands for wireless network bandwidths from the plurality of videos. The problem that I-frames of videos collide is resolved on a per-cell basis, with I-frames arranged for each cell.

18 Claims, 13 Drawing Sheets

(56) References Cited

U.S. PATENT DOCUMENTS

| | | | | |
|---|---|---|---|---|
| 2015/0085132 A1* | 3/2015 | Bekiares | ............... | H04N 7/181 |
| | | | | 348/159 |
| 2023/0262266 A1* | 8/2023 | Zhang | .................. | H04N 17/004 |
| | | | | 375/240.27 |
| 2023/0283804 A1* | 9/2023 | Shiizaki | ............... | H04N 19/177 |
| | | | | 375/240.15 |
| 2024/0430493 A1* | 12/2024 | Tao | ......................... | H04L 65/80 |

FOREIGN PATENT DOCUMENTS

| | | |
|---|---|---|
| CN | 112399141 A | 2/2021 |
| CN | 113259717 A | 8/2021 |

* cited by examiner

* The video capturing devices adjust positions of I-frames of videos

* The video capturing devices adjust positions of I-frames of videos

700

800

VIDEO TRANSMISSION METHOD AND APPARATUS

CROSS-REFERENCE TO RELATED APPLICATIONS

This application is a continuation of International Application No. PCT/CN2022/135123, filed on Nov. 29, 2022, which claims priority to Chinese Patent Application No. 202210125618.5, filed on Feb. 10, 2022. The disclosures of the aforementioned applications are hereby incorporated by reference in their entireties.

TECHNICAL FIELD

This application relates to the field of network technologies, and in particular, to a video transmission method and apparatus.

BACKGROUND

In video compression technologies such as H.264 and H.265, some video frame sequences are compressed into intra-frames (I-frame), some are compressed into predictive frames (P-frame), and some are compressed into bi-directional predictive frames (B-frame). An I-frame is a key frame, including complete information about an image. When an I-frame is decoded, only information in the I-frame needs to be used. Because I-frames carry a large amount of information and carry key information, a tolerable transmission latency is shorter, resulting in bursts of demands for bandwidths from the I-frames. Especially, if I-frames of a plurality of videos are aligned, or the I-frames of the videos collide, resulting in that a high peak-to-average ratio is still maintained during transmission of the plurality of videos over a communication link, capabilities of a communication system to bear video transmission are greatly limited. In particular, in a scenario in which the videos are transmitted over a wireless network, because a radio air interface has limited bandwidth resources, a problem of insufficient air interface bandwidths caused by a collision between the I-frames of the videos in the wireless network is particularly serious. As a result, videos borne by the radio air interface are limited.

In view of this, a problem of how a peak-to-average ratio of a plurality of videos at an air interface is reduced to reduce occupation of air interface bandwidths still needs to be further researched and discussed.

SUMMARY

Embodiments of this application provide a video transmission method and apparatus, to reduce demands for wireless network bandwidths from a plurality of videos. Technical solutions are as follows.

According to a first aspect, a video transmission method is provided. The method includes:

obtaining first positions of I-frames of a plurality of videos in a first cell;

performing arrangement based on the first positions of the I-frames of the plurality of videos, to obtain second positions of the I-frames of the plurality of videos, where a distance between second positions of I-frames of adjacent videos of the plurality of videos meets a condition; and sending indication information to a video capturing device management platform, where the indication information indicates to adjust a position of an I-frame of a first video of the plurality of videos from a first position of the I-frame of the first video to a second position of the I-frame of the first video, and the first position of the I-frame of the first video is different from the second position of the I-frame of the first video.

According to the method, after procedures such as obtaining positions of I-frames of videos, arranging the positions of the I-frames, and indicating the video capturing device management platform to adjust a position of an I-frame of a video are performed, the I-frames of the videos are staggered at a radio air interface, helping resolve a problem that I-frames of videos collide, and reduce demands for wireless network bandwidths from the plurality of videos.

Further, the problem that I-frames of videos collide is resolved on a per-cell basis, with I-frames arranged for each cell. In this way, the arrangement is performed at a finer granularity, redundancy of transmission bandwidths is avoided, and resource utilization is improved. In addition, in a scenario with many video capturing devices and many cells, I-frames of videos are spaced more widely, reducing both difficulty of arrangement and processing overheads of an algorithm.

Basic technical principles that achieve the effect are as follows: Resources of cells in a wireless network are independent of each other, and a video capturing device usually works in only a cell. Therefore, if each cell is not considered separately, that is, positions of I-frames of videos in all cells are arranged together, there is a higher degree of redundancy of transmission bandwidths in the scenario with many video capturing devices and many cells. In contrast, if arrangement is performed from a dimension of a cell with an aim of staggering positions of I-frames of different videos in a cell, a quantity of videos whose I-frames need to be ensured to be staggered during the arrangement is greatly reduced. In this case, the I-frames of the videos can be spaced more widely, improving effect of arrangement.

An analogy is used. A radio air interface is considered as a playground, a video is considered as a person in the playground who needs to queue, and arranging positions of I-frames is equivalent to queuing persons in the playground. For example, there are 100 videos that are transmitted concurrently on a wireless network. The 100 videos are borne by 10 radio cells, with each radio cell bearing 10 videos. Arranging positions of I-frames of the 100 videos is equivalent to researching how 100 persons are lined up in the playground. If the cells corresponding to the videos are not considered, arranging the positions of the I-frames of the 100 videos together is equivalent to arranging the 100 videos in a row. As a result, I-frames of different videos are spaced closely, and it is difficult to stagger the I-frames. If arrangement is performed on a per-cell basis, it is equivalent to arranging the 100 videos in 10 rows. In a row, only positions of I-frames of 10 videos need to be staggered. Apparently, I-frames of different videos can be spaced more widely, achieving better effect of arrangement.

Optionally, when positions of I-frames are arranged, not only the dimension of a radio cell but also a dimension of a direction in which videos are transmitted are considered. For example, positions of I-frames of a plurality of uplink videos borne by a radio cell are arranged, so that a distance between target positions of the I-frames of the different uplink videos borne by the radio cell meets the condition. For another example, positions of I-frames of a plurality of downlink videos borne by a radio cell are arranged, so that a distance between target positions of the I-frames of the different downlink videos borne by the radio cell meets the condition.

For example, the plurality of videos are all uplink videos in the first cell; or the plurality of videos are all downlink videos in the first cell.

With a collision between I-frames of videos being considered by following an idea that the videos are in a same cell and are transmitted in a same direction, bandwidth resources of a wireless network are further saved.

Basic technical principles that achieve the effect are as follows: When videos are transmitted on a wireless network, resources occupied during uplink transmission and resources occupied during downlink transmission are independent of each other. For example, resources of a channel 1 are occupied during uplink transmission, whereas resources of a channel 2 are occupied during downlink transmission; or an uplink transmission procedure of a video is borne by a wireless network, whereas a downlink transmission procedure of the video is borne by a wired network. If each transmission direction is not considered separately, that is, first positions of I-frames of uplink and downlink videos are arranged together, there is a higher degree of redundancy of transmission bandwidths. In contrast, if arrangement is performed from the dimension of a transmission direction with an aim of staggering first positions of I-frames of different videos that are in a same cell and are transmitted in a same direction, a granularity of the arrangement is finer, a quantity of videos whose I-frames need to be ensured to be staggered during the arrangement is greatly reduced, and the I-frames of the videos can also be spaced more widely. Therefore, difficulty of arrangement is reduced, effect of arrangement is improved, demands for transmission bandwidths of the wireless network are further reduced, and the processing overheads of the algorithm are significantly reduced.

Optionally, the obtaining first positions of I-frames of a plurality of videos includes: receiving the first positions of the I-frames of the plurality of videos from a terminal-side device or a system device.

With one of two ends (that is, a terminal-side device and a system device) connected via a radio air interface being responsible for recognizing first positions of I-frames of videos and sending the recognized first positions of the I-frames of the videos to a network capability exposure platform, it helps the recognized first positions of the I-frames be matched with an I-frame collision that actually occurs at the radio air interface, improving accuracy of the recognition.

Optionally, a video sending end of two ends connected via a radio air interface is responsible for recognizing first positions of I-frames of videos. For example, in a scenario of uplink transmission, a terminal-side device recognizes first positions of I-frames of videos, and in a scenario of downlink transmission, a system device recognizes first positions of I-frames of videos. For example, for the first video, when the first video is an uplink video, a terminal-side device recognizes the first position of the I-frame of the first video, or when the first video is a downlink video, a system device recognizes the first position of the I-frame of the video. In this manner, traffic based on which the first positions of the I-frames are recognized does not pass through the air interface, shielding impact, on a recognition process, of factors such as jitter that occur during transmission of the videos through the radio air interface. Therefore, original information of the videos is better leveraged during the recognition, further improving precision of the recognition.

Optionally, the obtaining first positions of I-frames of a plurality of videos includes: recognizing the first positions of the I-frames of the plurality of videos based on traffic characteristics of the plurality of videos. For example, one of two ends (that is, a terminal-side device and a system device) connected via a radio air interface is responsible for capturing traffic characteristics of videos when transmitting video streams, and sending the captured traffic characteristics to the network capability exposure platform. The network capability exposure platform recognizes first positions of I-frames based on the received traffic characteristics.

With the first positions of the I-frames of the videos being recognized based on traffic of the videos that exists when the videos are transmitted through the radio air interface, it helps the recognized first positions of the I-frames be matched with an I-frame collision that actually occurs at the radio air interface, improving accuracy of the recognition.

Optionally, the indication information includes an amount of adjustment that is for the first position of the I-frame of the first video.

Optionally, the amount of adjustment is related to a total quantity of videos borne by the first cell.

When first positions of I-frames of videos are adjusted, a quantity of videos actually borne by a cell is considered. For example, if a cell bears a small quantity of videos, I-frames of the videos can be arranged to be spaced more widely, so that arrangement of the I-frames of the videos matches a current service scenario, improving flexibility and precision of the solutions.

Optionally, the amount of adjustment is also related to an I-frame tolerable transmission duration of the first video, and the I-frame tolerable transmission duration is a maximum latency for which a wireless communication system is allowed to transmit an I-frame of a video.

When first positions of I-frames of videos are adjusted, I-frame tolerable transmission durations of the videos are considered. In this way, quality of service of the videos is also taken into account, and degradation of quality of service (for example, a latency) of the videos is minimized.

In some implementations, joint arrangement is supported. To be specific, a plurality of entities collaborate together to arrange a position of an I-frame. For example, the network capability exposure platform and the video capturing device management platform perform joint arrangement. In a possible implementation, the network capability exposure platform is responsible for determining an adjustment amount range for a position of an I-frame, and the video capturing device management platform further arranges the position of the I-frame based on the adjustment amount range, to obtain an amount of adjustment that is for the position of the I-frame of a video. In this implementation, the indication information includes an adjustment amount range corresponding to an amount of adjustment that is for the position of the I-frame of the first video.

In the joint arrangement manner, it is equivalent to that the network capability exposure platform provides the video capturing device management platform with a plurality of options for an amount of adjustment, and the video capturing device management platform is allowed to flexibly determine a specific amount of adjustment for a first position of an I-frame of a particular video in a range of an adjustment amount range.

Optionally, the indication information further includes the first position of the I-frame of the first video.

Optionally, that a distance between second positions of I-frames of adjacent videos of the plurality of videos meets a condition includes:

a distance between second positions of I-frames of adjacent videos of the plurality of videos is equal to a ratio of an I-frame interval to the total quantity of videos borne by the first cell.

In the manner, arrangement aimed at even distribution is supported, helping I-frames of a plurality of videos be evenly arranged at a radio air interface with a largest spacing.

Optionally, when the plurality of videos are all uplink videos in the first cell, that a distance between second positions of I-frames of adjacent videos of the plurality of videos meets a condition includes:

a distance between second positions of I-frames of adjacent videos of the plurality of videos is equal to a ratio of an I-frame interval to a total quantity of uplink videos in the first cell.

Optionally, when the plurality of videos are all downlink videos in the first cell, that a distance between second positions of I-frames of adjacent videos of the plurality of videos meets a condition includes:

a distance between second positions of I-frames of adjacent videos of the plurality of videos is equal to a ratio of an I-frame interval to a total quantity of downlink videos in the first cell.

Optionally, that a distance between second positions of I-frames of adjacent videos of the plurality of videos meets a condition includes:

a distance between second positions of I-frames of adjacent videos of the plurality of videos is greater than or equal to an I-frame tolerable transmission duration, where the I-frame tolerable transmission duration is a maximum latency for which a wireless communication system is allowed to transmit an I-frame of a video.

In the manner, because the I-frame tolerable transmission duration is considered when the I-frames are arranged, quality of service of the videos being affected is avoided, while it is ensured that the I-frames of the plurality of videos are staggered at a radio air interface.

In a scenario in which uplink transmission procedures and downlink transmission procedures of videos are both borne by a wireless network, in a possible implementation, first positions of I-frames are arranged in an iterative manner.

Basic principles of the iterative manner are as follows: determining first positions of I-frames of different videos gradually. For example, first, an initial video (also referred to as a seed video) is selected, and a target first position of an I-frame of the initial video is set. Then, for a video following the initial video, a first position of an I-frame at which the video does not collide with the preceding video is found. In this way, second positions of I-frames of videos are determined sequentially until second positions of I-frames of all videos are determined.

For example, the performing arrangement based on the first positions of the I-frames of the plurality of videos, to obtain second positions of the I-frames of the plurality of videos includes:

determining a second position of an I-frame of a second video of the plurality of videos in an uplink direction based on a second position of the I-frame of the first video in the uplink direction, where a distance between the second position of the I-frame of the first video in the uplink direction and the second position of the I-frame of the second video in the uplink direction meets the condition; and determining a second position of the I-frame of the second video in a downlink direction based on the second position of the I-frame of the second video in the uplink direction and a second position of an I-frame of a third video in the downlink direction, where the second position of the I-frame of the second video in the uplink direction and the second position of the I-frame of the third video in the downlink direction meet the condition; and the first video and the second video are both uplink videos in the first cell, the second video and the third video are both downlink videos in a second cell, and the second cell is a cell different from or the same as the first cell.

In the implementation, when a first position of an I-frame is arranged, not only a cell (that is, an uplink cell) that bears an uplink transmission procedure of the video but also a cell (that is, a downlink cell) that bears a downlink transmission procedure of the video are considered, so that a first position of the I-frame of the video and first positions of I-frames of other videos are staggered in the uplink cell, and a first position of the I-frame of the video and first positions of I-frames of other videos are staggered in the downlink cell. In this way, a requirement of uplink transmission and a requirement of downlink transmission are both taken into account.

Optionally, before the performing arrangement based on the first positions of the I-frames of the plurality of videos, to obtain second positions of the I-frames of the plurality of videos, the method further includes:

determining the plurality of videos in the first cell from videos in a plurality of radio cells based on correspondences between radio cells and videos.

According to a second aspect, a video transmission method is provided, applied to a video capturing device management platform. The method includes:

receiving indication information, where the indication information indicates to adjust a position of an I-frame of a first video of a plurality of videos from a first position of the I-frame of the first video to a second position of the I-frame of the first video, and the first position of the I-frame of the first video is different from the second position of the I-frame of the first video;

obtaining, based on the indication information, an amount of adjustment that is for the position of the I-frame of the first video; and sending an adjustment command to a video capturing device, where the video capturing device is a data source of the first video, and the adjustment command instructs to adjust the position of the I-frame of the first video by the amount of adjustment.

Optionally, the obtaining, based on the indication information, an amount of adjustment that is for the first position of the I-frame of the first video includes:

obtaining the amount of adjustment that is for the first position of the I-frame of the first video and that is carried in the indication information; or obtaining an adjustment amount range that corresponds to the amount of adjustment and that is carried in the indication information, where the amount of adjustment is for the first position of the I-frame of the first video; and determining, based on the adjustment amount range and the first position of the I-frame of the first video, the amount of adjustment that is for the first position of the I-frame of the first video.

According to a third aspect, a video transmission apparatus is provided. The video transmission apparatus has functions of implementing any one of the first aspect or the optional implementations of the first aspect. The video transmission apparatus includes at least one unit. The at least one unit is configured to implement the method according to any one of the first aspect or the optional implementations of the first aspect. In some embodiments, the unit in the video transmission apparatus is implemented by software. The unit in the video transmission apparatus is a program module. In some other embodiments, the unit in the video transmission apparatus is implemented by hardware or firmware.

Optionally, an obtaining unit is configured to receive first positions of I-frames of a plurality of videos from a terminal-side device or a system device.

Optionally, the obtaining unit is configured to recognize first positions of I-frames of a plurality of videos based on traffic characteristics of the plurality of videos.

Optionally, a processing unit is configured to:

determine a second position of an I-frame of a second video of the plurality of videos in an uplink direction based on a second position of an I-frame of a first video in the uplink direction, where a distance between the second position of the I-frame of the first video in the uplink direction and the second position of the I-frame of the second video in the uplink direction meets a condition; and determine a second position of the I-frame of the second video in a downlink direction based on the second position of the I-frame of the second video in the uplink direction and a second position of an I-frame of a third video in the downlink direction, where the second position of the I-frame of the second video in the uplink direction and the second position of the I-frame of the third video in the downlink direction meet the condition; and the first video and the second video are both uplink videos in a first cell, the second video and the third video are both downlink videos in a second cell, and the second cell is a cell different from or the same as the first cell.

Optionally, the processing unit is further configured to: determine the plurality of videos in the first cell from videos in a plurality of radio cells based on correspondences between radio cells and videos.

For specific details about the video transmission apparatus provided in the third aspect, refer to any one of the first aspect or the optional implementations of the first aspect. Details are not described herein again.

According to a fourth aspect, a video transmission apparatus is provided. The video transmission apparatus has functions of implementing any one of the second aspect or the optional implementations of the second aspect. The video transmission apparatus includes at least one unit. The at least one unit is configured to implement the method according to any one of the second aspect or the optional implementations of the second aspect. In some embodiments, the unit in the video transmission apparatus is implemented by software. The unit in the video transmission apparatus is a program module. In some other embodiments, the unit in the video transmission apparatus is implemented by hardware or firmware. For specific details about the video transmission apparatus provided in the fourth aspect, refer to any one of the second aspect or the optional implementations of the second aspect. Details are not described herein again.

Optionally, a processing unit is configured to: obtain an amount of adjustment that is for a position of an I-frame of a first video and that is carried in indication information; or obtain an adjustment amount range that corresponds to an amount of adjustment and that is carried in indication information, where the amount of adjustment is for a position of an I-frame of a first video; and determine, based on the adjustment amount range and a first position of the I-frame of the first video, the amount of adjustment that is for the position of the I-frame of the first video.

According to a fifth aspect, a computer device is provided. The computer device includes a processor. The processor is coupled to a memory. The memory stores at least one computer program instruction. The at least one computer program instruction is loaded and executed by the processor, so that the computer device implements the method according to any one of the first aspect or the optional implementations of the first aspect. For specific details about the computer device provided in the fifth aspect, refer to any one of the first aspect or the optional implementations of the first aspect. Details are not described herein again.

According to a sixth aspect, a computer device is provided. The computer device includes a processor. The processor is coupled to a memory. The memory stores at least one computer program instruction. The at least one computer program instruction is loaded and executed by the processor, so that the computer device implements the method according to any one of the first aspect or the optional implementations of the first aspect. For specific details about the computer device provided in the sixth aspect, refer to any one of the first aspect or the optional implementations of the first aspect. Details are not described herein again.

According to a seventh aspect, a computer-readable storage medium is provided. The storage medium stores at least one instruction. When the instruction is run on a computer, the computer is enabled to perform the method according to any one of the first aspect or the optional implementations of the first aspect.

According to an eighth aspect, a computer-readable storage medium is provided. The storage medium stores at least one instruction. When the instruction is run on a computer, the computer is enabled to perform the method according to any one of the second aspect or the optional implementations of the second aspect.

According to a ninth aspect, a computer program product is provided. The computer program product includes one or more computer program instructions. When the computer program instructions are loaded and run by a computer, the computer is enabled to perform the method according to any one of the first aspect or the optional implementations of the first aspect.

According to a tenth aspect, a computer program product is provided. The computer program product includes one or more computer program instructions. When the computer program instructions are loaded and run by a computer, the computer is enabled to perform the method according to any one of the second aspect or the optional implementations of the second aspect.

According to an eleventh aspect, a chip is provided. The chip includes a programmable logic circuit and/or program instructions. When being run, the chip is configured to implement the method according to any one of the first aspect or the optional implementations of the first aspect.

According to a twelfth aspect, a chip is provided. The chip includes a programmable logic circuit and/or program instructions. When being run, the chip is configured to implement the method according to any one of the second aspect or the optional implementations of the second aspect.

According to a thirteenth aspect, a video transmission system is provided. The system includes the video transmission apparatus according to any one of the first aspect or the optional implementations of the first aspect and the video transmission apparatus according to any one of the second aspect or the optional implementations of the second aspect.

According to a fourteenth aspect, a network system is provided. The system optionally includes video capturing devices, terminal-side devices of wireless communication, system devices of wireless communication, a network capability exposure platform, a network management platform, video capturing device management platforms, and video playing devices. The network capability exposure platform is configured to implement the method according to any one of the first aspect or the optional implementations of the first aspect. The video capturing device management platform is configured to implement the method according to any one of the second aspect or the optional implementations of the second aspect.

DESCRIPTION OF EMBODIMENTS

Figure 1:
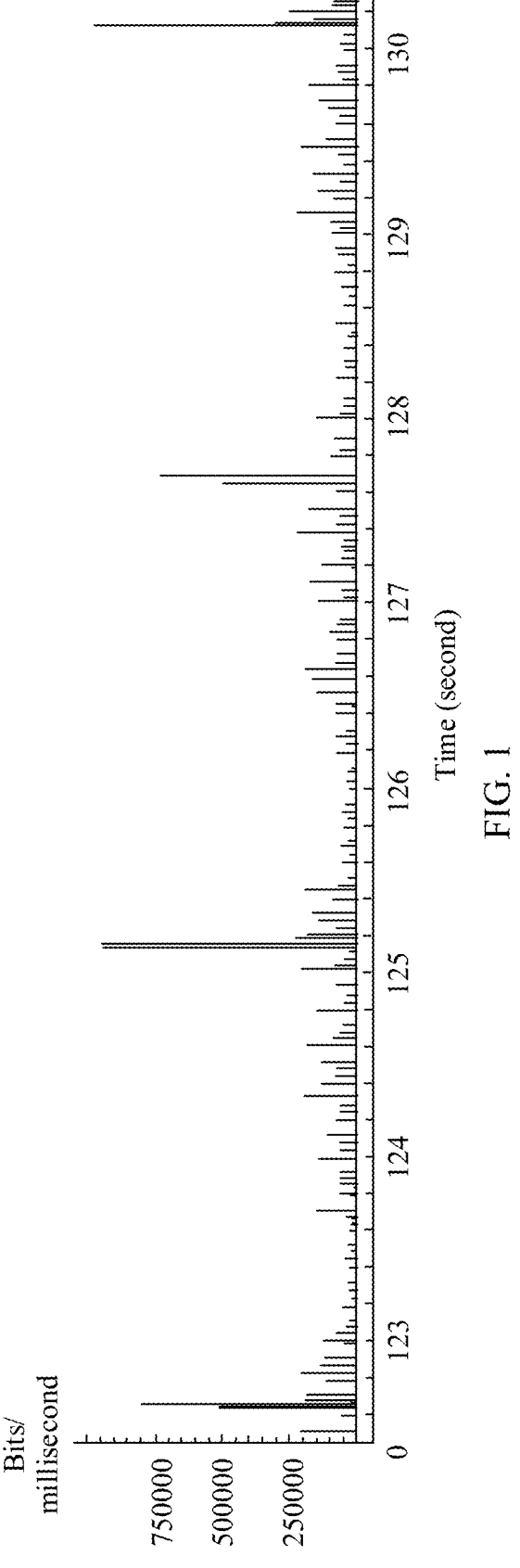
FIG. 1 is a schematic diagram of bursts of demands for bandwidths from I-frames in an H.265 video stream according to an embodiment of this application.

To make objectives, technical solutions, and advantages of this application clearer, the following further describes implementations of this application in detail with reference to the accompanying drawings.

The following explains some terms and concepts used in embodiments of this application.

(1) Video Encoding

In a video encoding technology, a video is usually encoded into intra-frames (I-frame), predictive frames (P-frame), and bi-directional predictive frames (B-frame) in time domain. The video encoding technology is, for example, H.264 or H.265.

(2) I-Frame

An I-frame is an intra-frame, also referred to as a key frame or an intra-picture (intra picture). An I-frame is an independent frame with all information. When an I-frame is decoded, decoding can usually be performed independently without reference to other pictures. An I-frame may be simply understood as a static picture. A first frame in a video sequence is usually an I-frame, because the first frame is a key frame. Among I-frames, P-frames, and B-frames, the I-frames carry a largest amount of information. An I-frame is periodic in time domain. To be specific, an I-frame occurs at intervals of a time period. For example, an I-frame occurs every 2.5 seconds(s). A time period of an I-frame may be specifically set based on different cases. In addition, in a time period of an I-frame, similar to 2.5 s mentioned above, a moment of the I-frame is included, that is, a position of the I-frame.

(3) I-Frame Interval

An I-frame interval indicates a period of occurrence of an I-frame in a video. Usually, an I-frame interval is measured in a quantity of video frames. For example, an I-frame interval is 50 frames. Alternatively, an I-frame interval is measured in a time unit. For example, when a frame rate of a video is 20 frames/second, an I-frame interval is 2.5 seconds.

(4) Position of an I-Frame

A position of an I-frame is a position at which the I-frame occurs in time domain. From a perspective of encoding, an I-frame is periodic. For example, an I-frame occurs every 2.5 seconds in a video. A specific position at which an I-frame occurs in a period of the I-frame indicates that there are a plurality of possible positions for the I-frame in a period of the I-frame. For example, in a 2.5-second period of an I-frame, the I-frame may occur at a position of 0 milliseconds (in this case, a position of the I-frame is the position of 0 milliseconds), or the I-frame may occur at a position of 10 milliseconds (in this case, a position of the I-frame is the position of 10 milliseconds), or the I-frame may occur at a position of 20 milliseconds (in this case, a position of the I-frame is the position of 20 milliseconds).

(5) I-Frame Tolerable Transmission Duration

A latency is introduced during end-to-end transmission of an I-frame. Some videos with a quite high requirement for real-time performance such as surveillance videos require a short I-frame transmission latency, to avoid provisioning of an actual service being affected due to an excessively long I-frame transmission latency. In this embodiment, an I-frame longest transmission latency that a wireless communication system can tolerate is referred to as an I-frame tolerable transmission duration. A value of an I-frame tolerable transmission duration is optionally determined based on a service requirement. For example, an I-frame tolerable transmission duration is 100 milliseconds or shorter. A specific value of an I-frame tolerable transmission duration is not limited in this embodiment.

(6) I-Frame Collision

In this specification, an I-frame collision means that I-frames of a plurality of videos overlap in their respective I-frame tolerable transmission durations. When an I-frame collision occurs, I-frame throughputs of videos encounter superimposition effect. Demands for bandwidths from I-frames also encounter superimposition effect. In other words, a network is required to provide a sum of the demands for bandwidths. If the network cannot provide the sum of the demands for bandwidths, the I-frames cannot be transmitted within tolerable transmission durations, affecting quality of the videos.

(7) Radio Cell

A radio cell, referred to as a cell (cell) for short, is a region covered by radio signals in a wireless communication system. One cell is usually a range that signals of one base station or a part (for example, one antenna) of a base station can cover. A cell is also referred to as a radio cell or a cellular cell. In terms of signal characteristics, a cell has an independent cell identifier (ID). A cell ID is optionally notified to a terminal in a broadcasting manner.

(8) Uplink and Downlink

Uplink and downlink are two directions in which data is transmitted on a network. Uplink is a transmission direction from a terminal-side device to a system device, for example, from a mobile phone to a base station. Downlink is a transmission direction from a system device to a terminal-side device, for example, from a base station to a mobile phone. In wireless communication technologies, a channel occupied during uplink transmission is usually different from a channel occupied during downlink transmission.

(9) Uplink Video and Downlink Video

An uplink video is a video whose transmission direction includes an uplink direction. A downlink video is a video whose transmission direction includes a downlink direction.

From a perspective of a user or a terminal-side device, an uplink video is a video uploaded to a network, and a downlink video is a video downloaded from a network.

From a perspective of a channel occupied during wireless transmission, an uplink video is transmitted on an uplink channel, and a downlink video is transmitted on a downlink channel. An uplink channel is, for example, a physical uplink shared channel (PUSCH). A downlink channel is, for example, a physical downlink shared channel (PDSCH).

The uplink video and the downlink video are two attributes that are not mutually exclusive. In other words, a video may be both an uplink video and a downlink video. For example, an end-to-end transmission path of a video includes: a video capturing device→a terminal-side device 1→a system device→a terminal-side device 2→a video playing device. From a perspective of the path section of the terminal-side device 1→the system device, the video is an uplink video. From a perspective of the path section of the system device→the terminal-side device 2, the video is a downlink video.

(10) Wireless Communication System

In this embodiment, wireless communication systems include but are not limited to cellular network systems and wireless local area network (WLAN) systems. A wireless communication system includes terminal-side devices and system devices.

(11) Cellular Network System

A cellular network system is also referred to as a mobile network system. Cellular network systems include but are not limited to 4G systems such as long term evolution (LTE), 5G systems such as new radio (NR), 2G systems such as global system for mobile communications (GSM), and 3G systems such as a wideband code division multiple access (WCDMA) system. A cellular network system mainly includes user equipment, base stations, core network elements, and the like. The user equipment is a terminal-side device. The base stations and the core network elements are system devices.

(12) WLAN System

A WLAN system is also referred to as a wireless fidelity (WiFi) system. A WLAN system mainly includes access points (AP) and stations (STA). Standards used in the WLAN system include but are not limited to the institute of electrical and electronics engineers (IEEE) 802.11 series, for example, 802.11ax or 802.11be.

(13) Terminal-Side Device

A terminal-side device is a device deployed on a user side in a wireless communication system. In other words, from a perspective of a system device such as a base station, a terminal-side device is equivalent to a radio air interface user. Terminal-side devices include but are not limited to modules and customer premise equipment (CPE). In different standards, protocols, and service scenarios, terminal-side devices may be in different forms and have different names. For example, a terminal-side device is a terminal (terminal), user equipment (UE), a wireless terminal, a mobile terminal, a device-to-device communication (D2D) terminal, a vehicle to everything (V2X) terminal, a machine-to-machine/machine-type communications (M2M/MTC) terminal, an internet of things (IoT) terminal, a subscriber unit (subscriber unit), a subscriber station (subscriber station), a mobile station (mobile station), a remote station (remote station), an access point (AP), a remote terminal (remote terminal), an access terminal (access terminal), a user terminal (user terminal), a user agent (user agent), a user device (user device), or the like.

(14) System Device

A system device is a device deployed on a network side in a wireless communication system. The system device is configured to provide a terminal-side device with data transmission services that are performed based on wireless communication technologies. System devices include but are not limited to base stations or core network elements in cellular network systems and APs in WLAN systems.

(15) Radio Air Interface

A radio air interface is also referred to as an air interface. A radio air interface is an interface between a terminal-side device and a system device in a wireless communication system. For example, in a cellular network, an air interface is usually an interface between a base station and UE. In a wireless local area network, an air interface is usually an interface between an AP and a STA. A radio air interface is a virtual logical interface. A concept corresponding to the radio air interface is a line interface in wired communication. The line interface is usually an optical interface or an electrical interface. In various standards and protocols related to wireless communication technologies, technical specifications for wireless connections between terminal-side devices and system devices are defined by using air interfaces, helping enable wireless communication to be as reliable as wired communication.

(16) Traffic Characteristic

In this embodiment, unless otherwise specified, traffic is a data stream carrying a video, that is, a video stream. Traffic includes a plurality of packets that are transmitted sequentially. One packet optionally includes one video frame. A traffic characteristic includes bandwidths that are occupied when traffic is transmitted. In a traffic flow, an amount of data in a packet carrying an I-frame is greater than an amount of data in a packet carrying a P-frame or a packet carrying a B-frame. Therefore, when traffic passes through a radio air interface, occupied bandwidths usually reach a peak when a packet carrying an I-frame passes through the radio air interface.

(17) Video Capturing Device

A video capturing device is any device that can shoot and generate a video. In other words, the video capturing device can act as a data source of a video. The video capturing device is, for example, any device with a camera. Video capturing devices include but are not limited to cameras, mobile phones, tablet computers, wearable devices, personal computers, notebook computers, wearable devices, and internet of things (IoT) terminals.

(18) Video Capturing Device Management Platform

A video capturing device management platform is a service control platform that manages one or more video capturing devices (for example, a network camera). A video capturing device management platform can adjust parameters of a video shot by a video capturing device, for example, a bit rate, an I-frame period, and an I-frame offset. For brevity, a video capturing device management platform is sometimes referred to as a management platform below in this specification.

(19) Network-Service Collaboration

Network-service collaboration is close collaboration between a network and a service. The network and the service exchange information bidirectionally, so that the service can be better satisfied. Network-service collaboration includes adjusting the network based on the service and adjusting the service based on the network.

(20) Network Capability Exposure Platform

A network capability exposure platform is a network-service collaboration platform between a wireless network and a service platform (for example, a video capturing device management platform). On the one hand, the network capability exposure platform is optionally configured to receive service parameters of the service platform and then translate the service parameters into requirements for the wireless network. On the other hand, the network capability exposure platform optionally feeds information back to the service platform based on measurements of the wireless network. The network capability exposure platform is optionally a logical network element.

The network capability exposure platform may be implemented in many manners. Optionally, the network capability exposure platform is disposed with a network element on a live network. For example, the network capability exposure platform is integrated in a network-side network element, a network element housing a network management platform, or another network element in a wireless communication system. Alternatively, the network capability exposure platform is a standalone network element. The network element is specifically responsible for undertaking collaborative tasks between the wireless network and the service platform. The network capability exposure platform is completely or partially implemented by software, hardware, firmware, or any combination thereof.

Optionally, the network capability exposure platform is a device. Alternatively, the network capability exposure platform is a cluster or distributed system including a plurality of devices. Alternatively, the network capability exposure platform is a virtual device implemented based on cloud computing and network functions virtualization (NFV) technologies, for example, a virtual machine or a container.

The network capability exposure platform is available in many product forms. For example, network capability exposure platforms include but are not limited to servers, server clusters, personal computers, notebook computers, dedicated service boards, or processing chips with computing capabilities.

(21) Network Management Platform

A network management platform is a platform that manages and controls terminal-side devices or system devices in a wireless communication system.

(22) P-Frame

A P-frame is a predictive frame, and can be encoded only with reference to a preceding I-frame. A P-frame indicates differences between a current frame picture and a preceding frame. A preceding frame of a P-frame may be an I-frame or a P-frame. When a P-frame is decoded, differences defined in the P-frame need to be superimposed on a preceding buffered picture, to generate a final picture. A P-frame usually occupies fewer data bits than an I-frame. However, a downside is that a P-frame is quite sensitive to a transmission error because the P-frame has complex dependencies on a preceding reference frame such as a P-frame or an I-frame.

(23) B-frame

A B-frame is a bi-directional predictive frame. A B-frame records differences between the B-frame and a preceding frame and differences between the B-frame and a succeeding frame. In other words, to decode a B-frame, not only a preceding buffered picture needs to be obtained, but also a succeeding picture needs to be decoded. A final picture is obtained by superimposing data in the B-frame on the preceding and succeeding pictures. A B-frame has a high compression rate but also a high requirement for decoding performance.

(24) Frame Rate of a Video

A frame rate of a video is a quantity of frames generated per second when the video is encoded. For example, a frame rate of a video is 20 frames/second. For example, with reference to FIG. 3, a frame exists at a position on a horizontal axis at which a vertical line occurs.

(25) Module

A module, also referred to as a wireless communication module, a radio frequency module, or a wireless communication chip, is a hardware element supporting wireless communication functions.

(26) Base Station

A base station is a wireless communication station installed at a fixed location in a cellular network. Main functions of a base station are to provide wireless coverage and support communication between terminals and a core network. Base stations include but are not limited to evolved NodeBs (eNB or eNodeB) in LTE and base stations (gNodeB, gNB) in 5G networks such as new radio (new radio, NR).

(27) System Frame (SFN, Also Referred to as Radio Frame (Radio Frame))

In a wireless network, data is usually transmitted with a system frame as a unit. One system frame is equivalent to one data transmission period or a unit of time of data transmission. In 5G and LTE, one system frame occupies 10 ms.

(28) Frame Number

A frame number is a number of a system frame. A frame number is information used to identify a system frame. For example, frame numbers are 0 to 1023 (the 1024 standard).

(29) Subframe (Subframe)

A subframe is a smaller unit of time than a system frame. One system frame includes a plurality of subframes. For example, in LTE, one system frame includes 10 subframes.

Each subframe is 1 millisecond. Duration of each subframe is equal to one transmission time interval (TTI).

(30) Subframe Index

A subframe index is an index of a subframe. A subframe index is used to identify a corresponding subframe in a system frame. For example, in LTE, one system frame includes 10 subframes, and subframe indexes of the 10 subframes are 0 to 9 sequentially.

(31) Video Identifier

A video identifier is information identifying a video. For example, a video identifier is a combination of a number of a video group to which a video belongs and an IP address of a video capturing device that captures the video. For another example, a video identifier is a name, a number, or the like of a video.

(32) Number of a Video Group

A number of a video group is also referred to as an identifier of a video group. A number of a video group is information identifying the video group. Videos in a video group have a same video group number.

(33) Peak-to-Average Ratio

A peak-to-average ratio, also referred to as a peak factor, is a ratio of a peak to an average (a valid value) of a waveform.

(34) Target Position of an I-Frame

A target position of an I-frame is a position to which the I-frame needs to be adjusted, equivalent to a position at which an I-frame of a video is expected to be. For example, the following is found after positions of I-frames of a video 1 and a video 2 are arranged: When the I-frame of the video 1 is at a position 1 and the I-frame of the video 2 is at a position 2, it can be ensured that the I-frame of the video 1 and the I-frame of the video 2 do not collide. In this case, the position 1 is determined as a target position of the I-frame of the video 1, and the position 2 is determined as a target position of the I-frame of the video 2.

The following explains meanings of mathematical symbols and parameters in some algorithmic formulas used in embodiments of this application.

(a) Mod mod represents a modulo operation (modulo operation) and is to find a remainder when one number is divided by another.

(b) Sum sum represents a summation operation and is to find a sum of two or more numbers.

(c) Mbps

Mbps, an abbreviation for megabits per second, is a unit of transmission rate and indicates a quantity of bits (bits) transmitted per second.

(d) ms ms represents millisecond and is a unit of time. ms is an abbreviation for millisecond.

The following describes an application scenario of an embodiment of this application by using an example.

Videos are one of important applications in current production and life. Due to a large amount of raw data in a video, generally, the video is encoded and compressed before being transmitted and stored. An important basis in encoding and compression technologies is characteristics of correlations between adjacent frames of a video signal. Without loss of generality, in video compression technologies such as H.264 and H.265, some video frame sequences are compressed into I-frames, some are compressed into P-frames, and some are compressed into B-frames. An I-frame is a key frame, including complete information about an image. When an I-frame is decoded, only information in the I-frame needs to be used. A P-frame is a predictive frame. To be specific, when a P-frame is decoded, not only the P-frame but also information in a preceding related frame need to be referenced. A B-frame is a bi-directional predictive frame. When a B-frame is decoded, not only a preceding existing frame but also a succeeding frame to be decoded need to be referenced. Generally, a compression rate of I-frames is 7, a compression rate of P-frames is 20, and a compression rate of B-frames can reach 50. In addition, because I-frames carry key information, an I-frame tolerable transmission latency is required to be shorter, resulting in bursts of demands for bandwidths from the I-frames.

FIG. 1 is a schematic diagram of bursts of demands for bandwidths from I-frames in an H.265 video stream according to an embodiment. FIG. 1 shows a relationship between bandwidths used and time during transmission of a video stream.

According to actual tests, bandwidths required by I-frames reach six to ten times average bandwidths required by videos. In this case, if a communication system can still bear a single video, capabilities of the communication system to bear video transmission are greatly limited in the following case: I-frames of a plurality of videos are aligned, resulting in that a high peak-to-average ratio is still maintained during transmission of the plurality of videos over a communication link. This is especially true for a wireless network in which radio air interface bandwidths are particularly valuable.

Without loss of generality, for example, based on requirements for quality of service of videos, an I-frame tolerable transmission duration is a, with a expressed in, for example, seconds, milliseconds, or a unit of time at another granularity.

Figure 2:
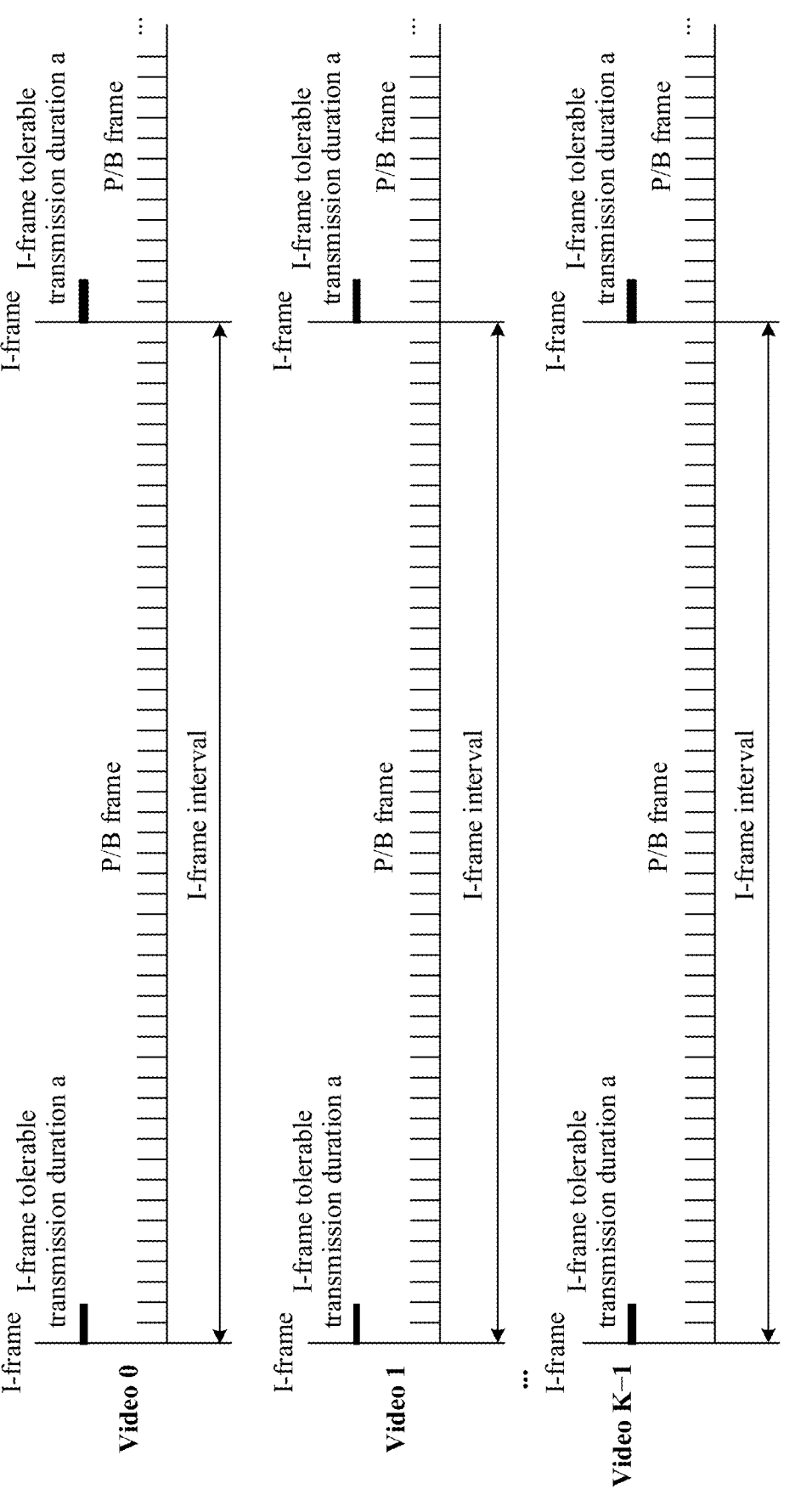
FIG. 2 is a schematic diagram of a case in which due to a collision between I-frames of a plurality of videos, required bandwidths are obtained by linearly adding up bandwidths required by each of the plurality of videos, according to an embodiment of this application.

FIG. 2 is a schematic diagram of a case in which due to a collision between I-frames of a plurality of videos, required bandwidths are obtained by linearly adding up bandwidths required by each of the plurality of videos, according to an embodiment. As shown in FIG. 2, starting positions of I-frames of a video 0 to a video K−1 are aligned. In this case, bandwidths required after the K videos are superimposed still need to reach six to ten times average bandwidths of the K videos. If average bandwidths of a single video are 4 Mbps, peak bandwidths of a single video can reach 40 Mbps, and the peak bandwidths of the K videos can reach K×40 Mbps, with the average bandwidths of the K videos being only K×4 Mbps. This restricts service bearing capabilities of a network, especially a wireless network, or conversely, affects quality of service of videos.

Therefore, how bandwidth demands caused by a collision between I-frames of videos are reduced becomes particularly important. Generally, an I-frame collision is random. In scenarios with high requirements for quality of videos, to avoid a random collision between I-frames, a bandwidth over-provisioning method is used in most cases. A bandwidth over-provisioning coefficient provides a balance to some extent based on a probability of a collision between I-frames of videos and requirements for quality of the videos. However, the bandwidth over-provisioning method is essentially a means of mitigation and cannot resolve a problem that I-frames of videos collide. This is because once I-frames of videos collide, the I-frames may always collide. To be specific, a probabilistic event becomes a deterministic event.

Through research and analysis, it is found that with factors in the following five aspects considered, bandwidth demands caused by a collision between I-frames of a plurality of videos are reduced while quality of service of the videos is ensured.

a. Randomness of a Position of an I-Frame

Although an I-frame of a video is periodic, a position of an I-frame of a video generated by a video capturing device is random, for example, related to a power-on time of the video capturing device to some extent.

b. Different Latencies Between Video Capturing Devices and a Radio Air Interface Time differences between moments at which I-frames of videos are generated at video capturing devices and moments at which the I-frames are expected to be sent at a radio air interface may be different. Therefore, it is not enough to consider only positions of I-frames generated by video capturing devices. In addition, moments at which I-frames are sent at a radio air interface also need to be considered.

c. A Collision Between I-Frames of Videos being Considered within a Cell

Transmission procedures of videos shot by different video capturing devices may be borne by different cells in a wireless network. Whether I-frames of videos collide is related to videos borne by a cell, usually with no need to consider videos borne by other cells. This is because for radio, a network is built on a cellular basis, and resources of cells in the network are independent of each other. A video capturing device usually works in only a cell. Therefore, an I-frame collision relates to only a cell. In this case, after adjustment is performed for some video capturing devices in a cell, a staggering problem can be basically resolved. If a cell factor is ignored, and positions of I-frames are adjusted with video capturing devices in all cells considered together, more resources need to be consumed, resulting in redundancy of transmission bandwidths.

d. A Collision Between I-Frames of Videos being Considered within a Video Transmission Direction In radio technologies, uplink resources and downlink resources are independent of each other. For example, uplink videos and downlink videos in a cell occupy different bandwidth resources. In addition, for a video, the following case probably occurs: The video is transmitted in a wireless manner in an uplink direction, while the video is transmitted in a wired manner in a downlink direction, or a collision does not need to be considered for the downlink direction. For example, positions of I-frames of the video and another video are actually spaced quite widely in the downlink direction. Alternatively, the video is transmitted in a wireless manner in a downlink direction, while the video is transmitted in a wired manner in an uplink direction, or a collision does not need to be considered for the uplink direction.

e. Uplink-Downlink Linkage

When an uplink transmission procedure and a downlink transmission procedure of a video are both borne by a wireless communication system, there is linkage between an uplink video and a downlink video. In this case, a conflict between uplink staggered transmission and downlink staggered transmission needs to be avoided, and it also needs to be ensured that staggering requirements of the uplink video and the downlink video are met.

Based on this, an embodiment provides a method for reducing demands for wireless network bandwidths from a plurality of videos based on a network-service collaboration mechanism, not only considering video services, but also paying full attention to a wireless network. A collision between I-frames of videos at an air interface is resolved from several dimensions: isolating a cell, uplink videos, and downlink videos. In other words, a collision between I-frames of uplink videos in a cell and a collision between I-frames of downlink videos in a cell are avoided.

Some embodiments of this application are applicable to a scenario in which a plurality of videos are transmitted on a wireless communication system, particularly applicable to multi-video scenarios with a high requirement for real-time performance of videos such as production monitoring and video manipulation. The wireless communication system includes but is not limited to 5G and Wi-Fi.

Figure 3:
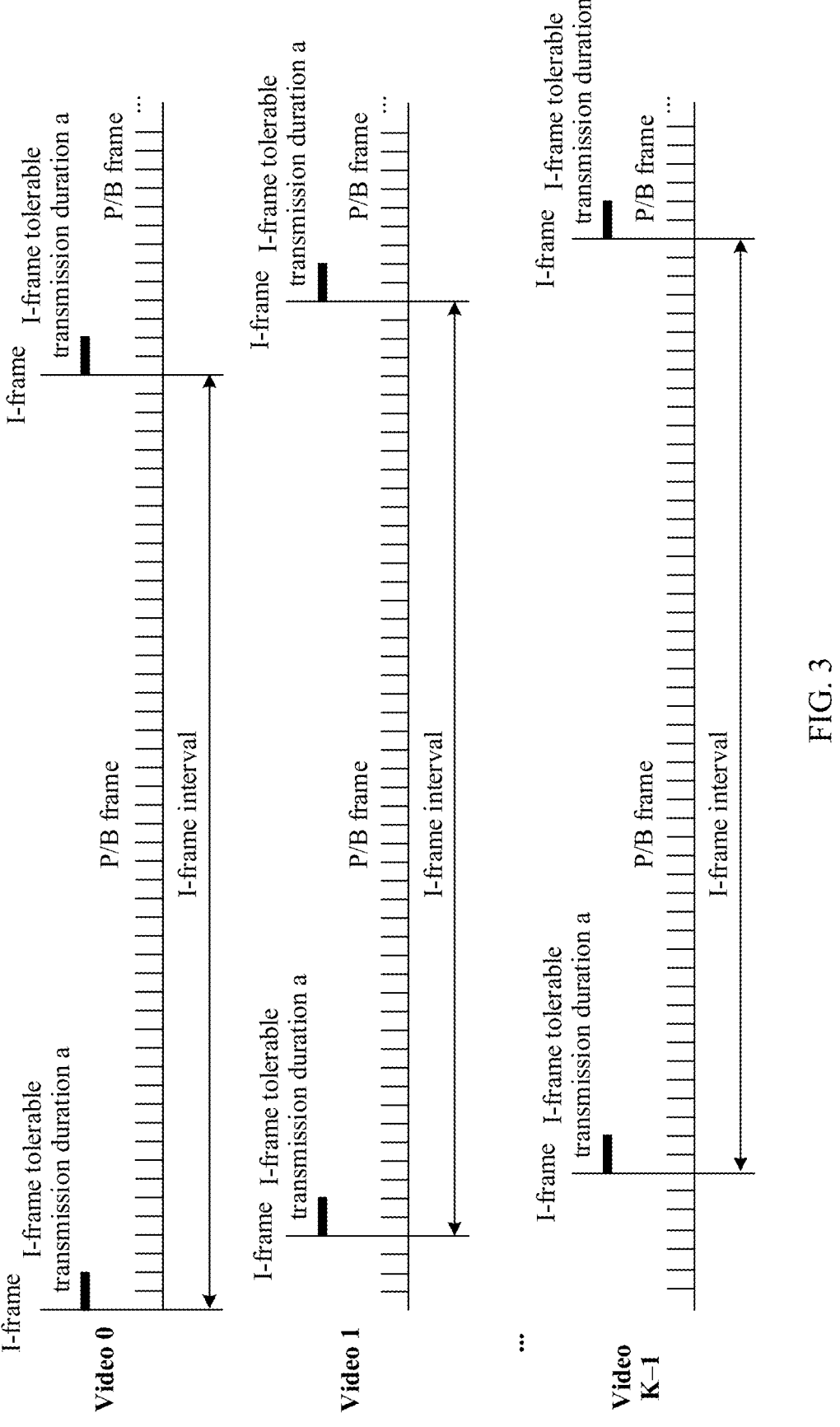
FIG. 3 is a schematic diagram of effect of staggering I-frames of a plurality of videos at a radio air interface according to an embodiment of this application.

In the scenarios, a peak-to-average ratio problem caused by transmission of a plurality of videos limits capabilities of a cell to bear a plurality of videos in wireless communication. The following is an urgent technical problem to be resolved: how a technical means is used to stagger I-frames of a plurality of videos at a radio air interface without affecting quality of service of the videos, and to finally achieve effect similar to that shown in FIG. 3. In FIG. 3, a horizontal axis represents time, and a vertical axis represents an amount of data in a video frame.

Further, even if there are too many videos to ensure that I-frames are staggered at a radio air interface, the I-frames of the videos can still be evenly distributed, to reduce consequences of peak-peak superimposition of the I-frames of the videos.

I-frames of a plurality of videos being staggered at a radio air interface means that in a cell, there is no I-frame data of another video in a range of an I-frame tolerable transmission duration a. The I-frame tolerable transmission duration is determined based on requirements for quality of service of a video to some extent. For example, for a video used for manipulation, a is usually not greater than 100 ms.

The following describes a system architecture in an embodiment of this application by using an example.

Figure 4:
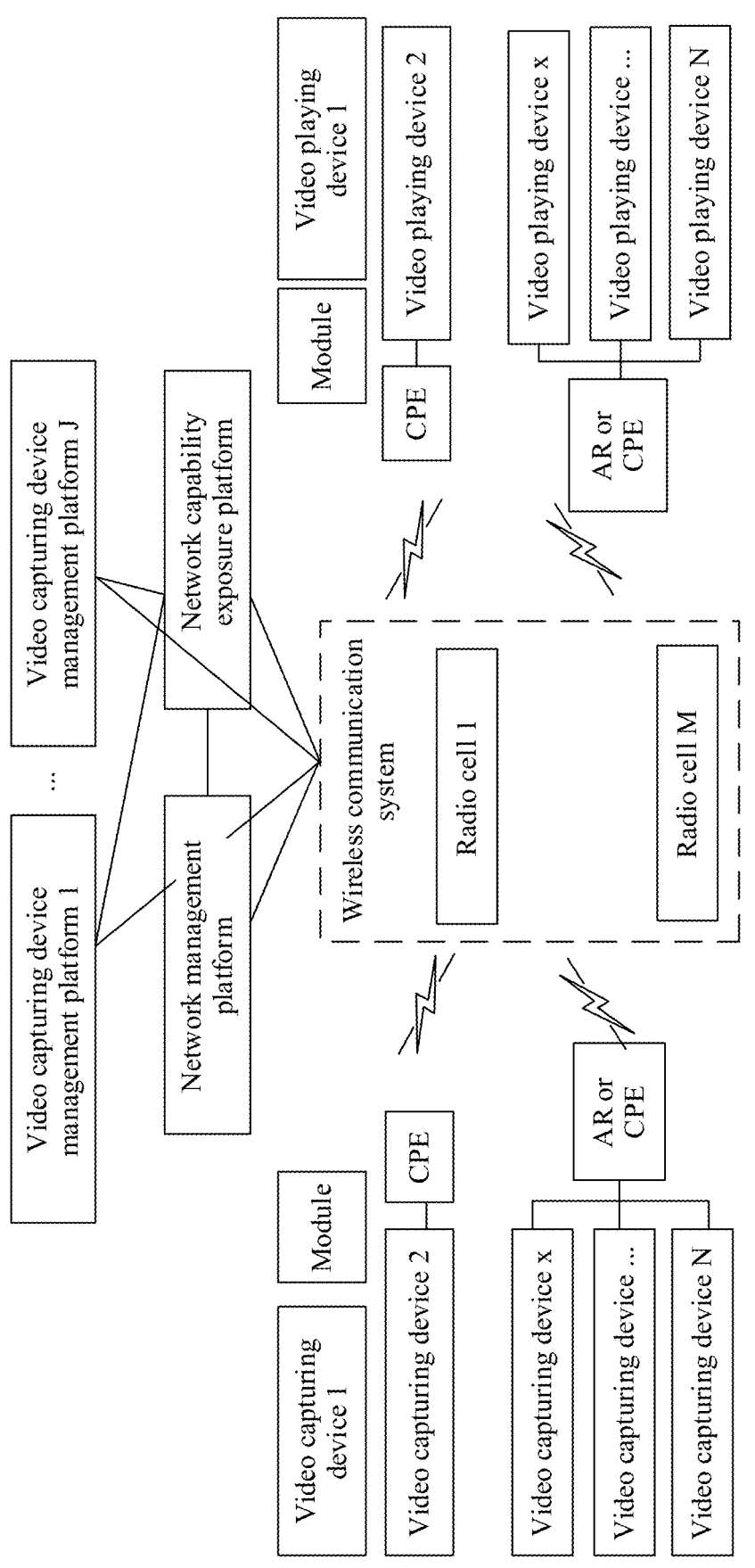
FIG. 4 is a diagram of an architecture of a system for reducing demands for wireless network bandwidths from a plurality of videos according to an embodiment.

FIG. 4 is a diagram of an architecture of a system according to an embodiment. The system shown in FIG. 4 helps reduce demands for wireless network bandwidths from a plurality of videos. The system includes video capturing devices, terminal-side devices, system devices, a network capability exposure platform, a network management platform, video capturing device management platforms, and video playing devices. In FIG. 4, an example is used for description in which the terminal-side devices are modules or CPEs.

The video capturing devices are connected to the terminal-side devices of wireless communication such as modules, CPEs, and access routers (AR). The terminal-side devices transfer uplink videos shot by different video capturing devices to the video capturing device management platforms through a wireless communication system and network. The video capturing device management platforms can adjust parameters of videos generated by video capturing devices, for example, a frame rate and a position of an I-frame. The network management platform is a platform that manages and controls the wireless communication system, the CPEs, and the like. The network capability exposure platform is a newly added logical function, and is configured to send network capabilities of the wireless communication system to the video capturing device management platforms and further perform network-service collaboration. The network capability exposure platform is especially configured to indicate a video capturing device management platform to adjust positions of I-frames of videos for video capturing devices managed by the video capturing device management platform. Downlink videos of the video playing devices may be alternatively obtained from the wireless communication system through the terminal-side devices of wireless communication such as modules and CPEs.

The following describes a flow of a method according to an embodiment of this application by using an example.

Figure 5:
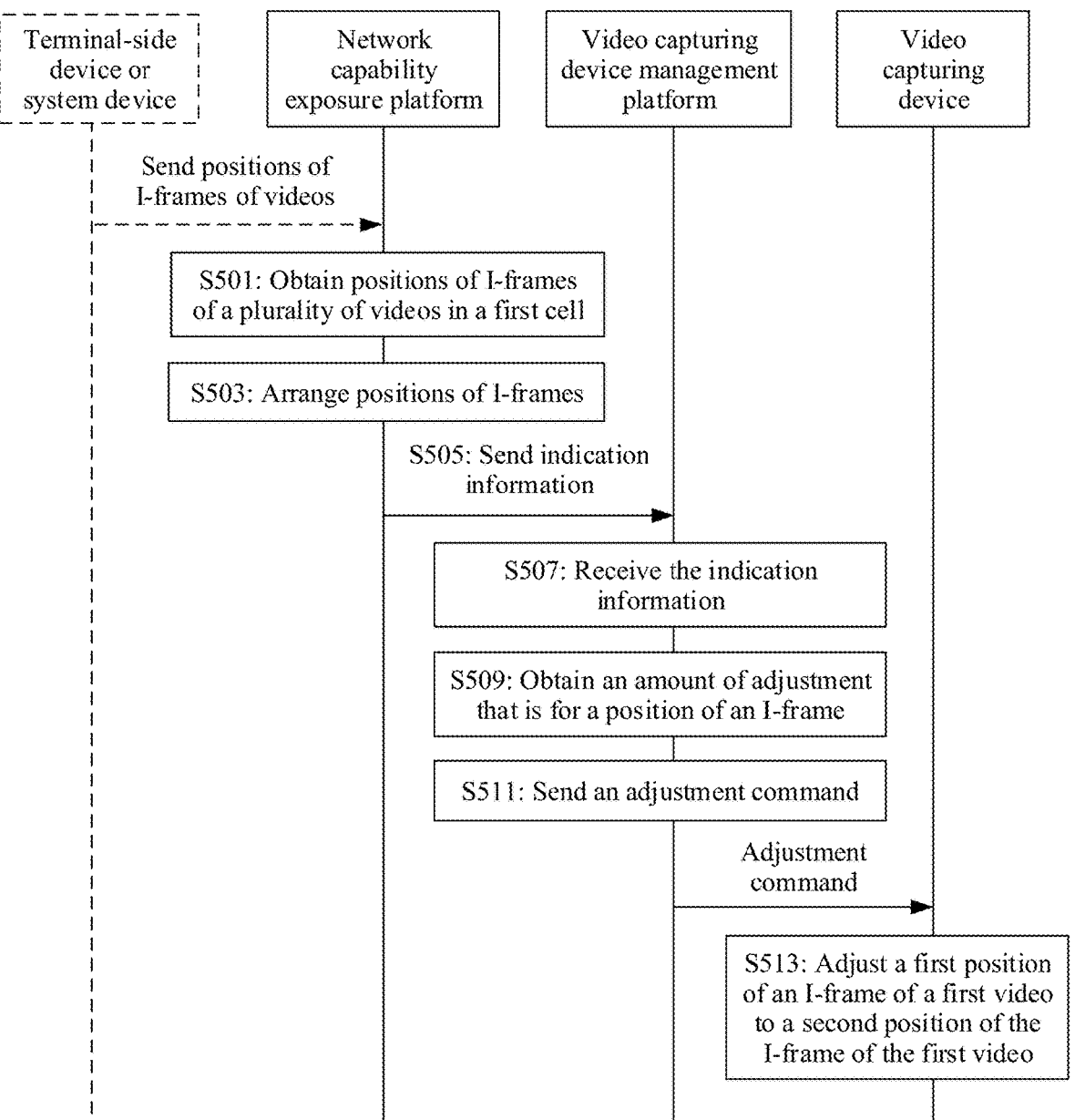
FIG. 5 is a flowchart of a video transmission method according to an embodiment of this application.

FIG. 5 is a flowchart of a video transmission method according to an embodiment of this application. The method may be provided as a solution to reducing demands for wireless network bandwidths from a plurality of videos. The method shown in FIG. 5 includes the following step S501 to step S513.

The method shown in FIG. 5 relates to a plurality of videos. To distinguish between different videos, "a first video", "a second video", and "a third video" are used to describe different videos.

For ease of understanding, the method shown in FIG. 5 focuses on how it is implemented that a distance between positions of I-frames of two videos (a first video and a second video) meets a condition, that is, the positions of the I-frames of the first video and the second video are staggered at a radio air interface. This embodiment is optionally used in a scenario in which I-frames of three or more videos need to be staggered at a radio air interface. For an implementation in a case of a larger quantity of videos, refer to a manner in which the first video and the second video are processed.

The method shown in FIG. 5 relates to pre-adjustment positions and post-adjustment positions of I-frames of videos. To distinguish between a pre-adjustment position and a post-adjustment first position of an I-frame, "a first position of the I-frame" and "a second position of the I-frame" are used to describe the pre-adjustment position of the I-frame and the post-adjustment position of the I-frame, respectively. Optionally, the first position of the I-frame is different from the second position of the I-frame. For example, a distance between first positions of I-frames of adjacent videos does not meet the condition, while a distance between second positions of I-frames of adjacent videos meets the condition. A first position of an I-frame may also be referred to as an initial position, original position, or current position of the I-frame. A second position of an I-frame may also be referred to as a target position of the I-frame.

The method shown in FIG. 5 optionally relates to a plurality of cells. To distinguish between different cells, "a first cell" and "a second cell" are used to describe different cells.

Step S501: A network capability exposure platform obtains first positions of I-frames of a plurality of videos.

There are a plurality of possible cases for videos whose I-frames' first positions are obtained by the network capability exposure platform. The following describes the plurality of videos from different dimensions by using examples.

From a dimension of radio cells, the plurality of videos optionally include videos that are borne by a plurality of radio cells, respectively. Alternatively, the plurality of videos include different videos borne by a radio cell. For example, the plurality of videos are a plurality of videos borne by a first cell.

From a dimension of transmission directions, the plurality of videos optionally include uplink videos and downlink videos. Alternatively, the plurality of videos are all uplink videos. Alternatively, the plurality of videos are all downlink videos. For example, the plurality of videos are all uplink videos in the first cell, or the plurality of videos are all downlink videos in the first cell.

From a dimension of video capturing device management platforms, the plurality of videos optionally include videos that correspond to a plurality of management platforms, respectively. Alternatively, the plurality of videos are videos corresponding to a management platform.

From a dimension of video capturing devices, the plurality of videos optionally include videos that are generated by a plurality of video capturing devices, respectively. Alternatively, the plurality of videos are different videos generated by a video capturing device.

From a dimension of radio air interface users or terminal-side devices, the plurality of videos optionally include videos that are sent by a plurality of terminal-side devices to a wireless network, respectively. Alternatively, the plurality of videos are a plurality of videos sent by a terminal-side device to a wireless network.

The network capability exposure platform obtains first positions of I-frames of videos in a plurality of implementations. The following provides descriptions from two aspects: a network element responsible for recognizing first positions of I-frames (that is, an entity for performing the recognition), and how first positions of I-frames of videos are recognized (that is, details of technical implementation of the recognition). Refer to the following aspect 1 and aspect 2.

Aspect 1: Network Element Responsible for Recognizing First Positions of I-Frames Optionally, one of two ends (that is, a terminal-side device and a system device) connected via a radio air interface is responsible for recognizing first positions of I-frames of videos and sending the recognized first positions of the I-frames of the videos to the network capability exposure platform. Optionally, the terminal-side device recognizes first positions of I-frames of videos. Alternatively, the system device recognizes first positions of I-frames of videos. In this manner, it helps the recognized first positions of the I-frames be matched with an I-frame collision that actually occurs at the radio air interface, improving accuracy of the recognition.

Optionally, a video sending end of two ends connected via a radio air interface is responsible for recognizing first positions of I-frames of videos. For example, in a scenario of uplink transmission, a terminal-side device recognizes first positions of I-frames of videos, and in a scenario of downlink transmission, a system device recognizes first positions of I-frames of videos. For example, for a first video, when the first video is an uplink video, a terminal-side device recognizes a first position of an I-frame of the first video, or when the first video is a downlink video, a system device recognizes a first position of an I-frame of the video. In this manner, traffic based on which the first positions of the I-frames are recognized does not pass through the air interface, shielding impact, on a recognition process, of factors such as jitter that occur during transmission of the videos through the radio air interface. Therefore, original information of the videos is better leveraged during the recognition, further improving precision of the recognition.

The implementations described above are all examples. Alternatively, the network capability exposure platform is responsible for recognizing first positions of I-frames. For example, one of two ends (that is, a terminal-side device and a system device) connected via a radio air interface is responsible for capturing traffic characteristics of videos when transmitting video streams, and sending the captured traffic characteristics to the network capability exposure platform. The network capability exposure platform recognizes first positions of I-frames based on the received traffic characteristics and parameters of the videos. Alternatively, an intermediate node through which a transmission path of a video on a wireless network passes is responsible for recognizing first positions of I-frames. Alternatively, one of two ends (that is, a terminal-side device and a system device) connected via a radio air interface copies received video streams through bypass mirroring, and sends the copied video streams to the network capability exposure platform. The network capability exposure platform extracts traffic characteristics from the video streams and recognizes first positions of I-frames. Alternatively, a probe is deployed on a transmission path of videos in a direct connection manner. The probe captures traffic characteristics of the videos and sends the traffic characteristics to the network capability exposure platform, so that the network capability exposure platform recognizes first positions of I-frames based on the traffic characteristics.

A specific network element that is responsible for recognizing first positions of I-frames is not limited in this embodiment.

Aspect 2: Details of Technical Implementation of Recognizing First Positions of I-Frames By using a process, as an example, in which the system device recognizes the first position of the I-frame of the first video, the following describes technical details of recognizing a first position of an I-frame. In the following recognition process, an execution body (that is, the system device) is optionally replaced with a terminal-side device, the network capability exposure platform, or another network element; and the recognized object (that is, the first video) is optionally replaced with another video of the plurality of videos other than the first video. Details of these combinations are not described.

In some embodiments, the system device recognizes the first position of the I-frame of the first video based on a traffic characteristic of the first video. In a possible implementation, the system device determines a peak of bandwidths occupied by traffic of the first video during transmission of the traffic of the first video, and uses a time domain position corresponding to the peak of the bandwidths as the first position of the I-frame of the first video. Optionally, the system device filters the traffic characteristic of the first video, to filter out noise included in the traffic characteristic, and determines the first position of the I-frame based on the filtered traffic characteristic.

In some embodiments, the system device recognizes the first position of the I-frame of the first video based on a traffic characteristic of the first video and parameters of the first video.

Optionally, the parameters of the first video used during the recognition include a frame rate and an I-frame interval. In an example embodiment, the system device determines a time period of occurrence of the I-frame of the first video based on a frame rate and an I-frame interval of the first video. The system device determines the first position of the I-frame based on the time period of the I-frame and the traffic characteristic of the first video.

Optionally, the parameters of the first video used during the recognition include not only a frame rate and an I-frame interval but also a bit rate. In an example embodiment, a bit rate of the first video is equivalent to a threshold. Based on the traffic characteristic of the first video, the system device determines time domain positions corresponding to points at which a bandwidth is greater than the bit rate of the first video, as candidate first positions of the I-frame. Based on a frame rate and an I-frame interval of the first video, the system device determines the first position of the I-frame of the first video from the candidate first positions of the I-frame.

Alternatively, the frame rate and the I-frame interval in the video parameters used during the recognition are replaced with the time period of the I-frame. To be specific, the time period of the I-frame is provided to the system device also as a video parameter, with the step of determining the time period of the I-frame based on the frame rate and the I-frame interval of the first video omitted.

In a possible implementation, the system device recognizes the first position of the I-frame of the first video based on a traffic characteristic of the first video by using an artificial intelligence (AI) model. In a possible implementation, the AI model is obtained through training by using a video dataset. The video dataset includes a plurality of sample videos, with a first position of an I-frame and a traffic characteristic of each sample video being known. A first position of an I-frame of a sample video serves as a label used during model training. In a model training phase, the traffic characteristics of the sample videos are input into the AI model. With an aim of reducing a difference between an output result of the AI model and a first position of an I-frame of a sample video, the AI model is continuously iterated. During the iteration, parameters of the AI model are continuously adjusted. This is equivalent to that the model gradually learns a mapping relationship between a first position of an I-frame and a traffic characteristic, and masters capabilities of obtaining a first position of an I-frame based on a traffic characteristic. When a difference between an output result of the AI model and a first position of an I-frame of a sample video, that is, an error of the AI model, is less than a threshold, training is stopped. The AI model is then used to recognize first positions of I-frames of traffic on a live network. For example, the system device inputs the traffic characteristic of the first video into the AI model. The AI model processes the traffic characteristic of the first video and outputs the first position of the I-frame of the first video.

The system device obtains the parameters of the first video in a plurality of manners. Optionally, the network capability exposure platform sends the parameters of the first video to the system device, and the system device receives the parameters of the first video sent by the network capability exposure platform, to recognize the first position of the I-frame in the foregoing implementations based on the parameters of the first video. Alternatively, a video capturing device management platform sends the parameters of the first video to the system device, and the system device receives the parameters of the first video sent by the video capturing device management platform. Alternatively, a video capturing device sends the parameters of the first video to the system device, and the system device receives the parameters of the first video sent by the video capturing device. How the system device obtains the parameters of the first video is not limited in this embodiment.

The network capability exposure platform obtains the parameters of the first video in a plurality of manners. Optionally, a video capturing device management platform sends the parameters of the first video to the network capability exposure platform, and the network capability exposure platform receives the parameters of the first video sent by the video capturing device management platform.

Step S503: The network capability exposure platform arranges positions of I-frames.

In some embodiments, the network capability exposure platform arranges positions of I-frames on a per-cell basis. Performing arrangement on a per-cell basis means performing arrangement with an aim of staggering positions of I-frames of different videos in a cell. In other words, when a position of an I-frame of a video in a cell is arranged, usually, only positions of I-frames of other videos in the cell are considered, with no need to consider positions of I-frames of videos in other cells.

Because positions of I-frames are arranged on a per-cell basis, it helps further save bandwidth resources of a wireless network, achieving better technical effects. Specific technical principles are as follows: Resources of cells in a wireless network are independent of each other, and a video capturing device usually works in only a cell. Therefore, if each cell is not considered separately, that is, positions of I-frames of videos in all cells are arranged together, there is a higher degree of redundancy of transmission bandwidths in a scenario with many video capturing devices and many cells. In contrast, if arrangement is performed from a dimension of a cell with an aim of staggering positions of I-frames of different videos in a cell, a granularity of the arrangement is finer, a quantity of videos whose I-frames need to be ensured to be staggered during the arrangement is greatly reduced, and the I-frames of the videos can also be spaced more widely. Therefore, difficulty of arrangement is reduced, effect of arrangement is improved, demands for transmission bandwidths of the wireless network are further reduced, and processing overheads of an algorithm are significantly reduced.

An analogy is used. A radio air interface is considered as a playground, a video is considered as a person in the playground who needs to queue, and arranging positions of I-frames is equivalent to queuing persons in the playground. For example, there are 100 videos that are transmitted concurrently on a wireless network. The 100 videos are borne by 10 radio cells, with each radio cell bearing 10 videos. Arranging positions of I-frames of the 100 videos is equivalent to researching how 100 persons are lined up in the playground. If the cells corresponding to the videos are not considered, arranging the positions of the I-frames of the 100 videos together is equivalent to arranging the 100 videos in a row. As a result, I-frames of different videos are spaced closely, and it is difficult to stagger the I-frames. If arrangement is performed on a per-cell basis, it is equivalent to arranging the 100 videos in 10 rows. In a row, only positions of I-frames of 10 videos need to be staggered. Apparently, I-frames of different videos can be spaced more widely.

In an example scenario, the network capability exposure platform obtains first positions of I-frames of four videos, with the four videos including a first video, a second video, a third video, and a fourth video. A transmission procedure of the first video and a transmission procedure of the second video are both borne by a first cell, while a transmission procedure of the third video and a transmission procedure of the fourth video are both borne by a second cell. When arranging the first positions of the I-frames of the four videos using a means of performing processing on a per-cell basis, the network capability exposure platform performs as follows: For the first cell, the network capability exposure platform arranges the first position of the I-frame of the first video and the first position of the I-frame of the second video, so that a distance between a second position of the I-frame of the first video and a second position of the I-frame of the second video meets the condition, where the third video and the fourth video usually do not need to be considered during the arrangement; and for the second cell, the network capability exposure platform arranges the first position of the I-frame of the third video and the first position of the I-frame of the fourth video, so that a distance between a second position of the I-frame of the third video and a second position of the I-frame of the fourth video meets the condition, where the first video and the second video usually do not need to be considered during the arrangement.

The network capability exposure platform distinguishes between videos in different cells in a plurality of implementations. Optionally, the network capability exposure platform obtains correspondences between videos and radio cells, and determines, based on the correspondences between videos and radio cells, videos borne by a radio cell. The correspondences between videos and radio cells include, for example, video identifiers and cell identifiers. For example, the network capability exposure platform determines the plurality of videos in the first cell based on correspondences between the first cell and the videos.

For example, when arranging the positions of the I-frames of the plurality of videos in the first cell, the network capability exposure platform searches the correspondences between videos and radio cells based on a video identifier of the first video and obtains a cell identifier of the first cell, and searches the correspondences between videos and radio cells based on a video identifier of the second video and obtains the cell identifier of the first cell. Because cell identifiers corresponding to the first video and the second video are both the cell identifier of the first cell, it is determined that the first video and the second video are both borne by the first cell.

The network capability exposure platform obtains the correspondences between videos and radio cells in a plurality of implementations. Optionally, the network capability exposure platform creates correspondences between video identifiers and radio air interface users (that is, terminal-side devices) and correspondences between radio air interface users and cells. Based on the correspondences between video identifiers and radio air interface users and the correspondences between radio air interface users and cells, the network capability exposure platform creates the correspondences between videos and radio cells.

Optionally, when arranging positions of I-frames, the network capability exposure platform considers not only the dimension of a radio cell but also a dimension of a direction in which videos are transmitted. For example, the network capability exposure platform arranges first positions of I-frames of a plurality of uplink videos borne by a radio cell, so that a distance between second positions of the I-frames of the different uplink videos borne by the radio cell meets the condition. For another example, the network capability exposure platform arranges first positions of I-frames of a plurality of downlink videos borne by a radio cell, so that a distance between second positions of the I-frames of the different downlink videos borne by the radio cell meets the condition.

In an example scenario, the network capability exposure platform obtains first positions of I-frames of four videos borne by a first cell, with the four videos including a video A, a video B, a video C, and a video D. An uplink transmission procedure of the video A and an uplink transmission procedure of the video B are both borne by the first cell, while a downlink transmission procedure of the video C and a downlink transmission procedure of the video D are both borne by the first cell. When arranging the first positions of the I-frames of the four videos using a means of performing processing on a per-cell+per-transmission direction basis, the network capability exposure platform performs as follows: For an uplink direction of the first cell, the network capability exposure platform arranges the first position of the I-frame of the video A and the first position of the I-frame of the video B, so that a distance between a second position of the I-frame of the video A and a second position of the I-frame of the video B meets the condition, where the video C and the video D usually do not need to be considered during the arrangement; and for a downlink direction of the first cell, the network capability exposure platform arranges the first position of the I-frame of the video C and the first position of the I-frame of the video D, so that a distance between a second position of the I-frame of the video C and a second position of the I-frame of the video D meets the condition, where the video A and the video B usually do not need to be considered during the arrangement.

With a collision between I-frames of videos being considered by following an idea that the videos are in a same cell and are transmitted in a same direction, the bandwidth resources of the wireless network are further saved, achieving better technical effects. Specific technical principles are, for example, as follows: When videos are transmitted on a wireless network, resources occupied during uplink transmission and resources occupied during downlink transmission are independent of each other. For example, resources of a channel 1 are occupied during uplink transmission, whereas resources of a channel 2 are occupied during downlink transmission; or an uplink transmission procedure of a video is borne by a wireless network, whereas a downlink transmission procedure of the video is borne by a wired network. If each transmission direction is not considered separately, that is, positions of I-frames of uplink and downlink videos are arranged together, there is a higher degree of redundancy of transmission bandwidths. In contrast, if arrangement is performed from the dimension of a transmission direction with an aim of staggering positions of I-frames of different videos that are in a same cell and are transmitted in a same direction, a granularity of the arrangement is finer, a quantity of videos whose I-frames need to be ensured to be staggered during the arrangement is greatly reduced, and the I-frames of the videos can also be spaced more widely. Therefore, difficulty of arrangement is reduced, effect of arrangement is improved, demands for transmission bandwidths of the wireless network are further reduced, and the processing overheads of the algorithm are significantly reduced.

When a position of an I-frame of a video is arranged, it is optional to consider only one cell. In some other embodiments, a plurality of cells are considered when a position of an I-frame of a video is arranged. For example, in a scenario in which an uplink transmission procedure and a downlink transmission procedure of a video are both borne by a wireless network, when a position of an I-frame is arranged, not only a cell (that is, an uplink cell) that bears the uplink transmission procedure of the video but also a cell (that is, a downlink cell) that bears the downlink transmission procedure of the video are considered, so that a second position of the I-frame of the video and second positions of I-frames of other videos are staggered in the uplink cell, and a second position of the I-frame of the video and second positions of I-frames of other videos are staggered in the downlink cell. In this way, a requirement of uplink transmission and a requirement of downlink transmission are both taken into account.

The "uplink cell" and "downlink cell" described herein are used to logically distinguish between cells corresponding to different transmission directions. An uplink cell and a downlink cell are optionally different radio cells or a same radio cell. Whether an uplink cell and a downlink cell are physically a same cell is not limited in this embodiment. For example, if an uplink transmission procedure of a video is borne by a cell A and a downlink transmission procedure of the video is also borne by the cell A, an uplink cell and a downlink cell of the video are both the cell A from a perspective of the video.

In a scenario in which uplink transmission procedures and downlink transmission procedures of videos are both borne by a wireless network, in a possible implementation, positions of I-frames are arranged in an iterative manner.

Basic principles of the iterative manner are as follows: determining second positions of I-frames of different videos gradually. For example, first, an initial video (also referred to as a seed video) is selected, and a second position (or a target position) of an I-frame of the initial video is set. Then, for a video following the initial video, a position of an I-frame (or a second position or target position of an I-frame) at which the video does not collide with the preceding video is found. In this way, second positions of I-frames of videos are determined sequentially until second positions of I-frames of all videos are determined.

In an example scenario, the network capability exposure platform obtains first positions of I-frames of three videos, with the three videos being a first video, a second video, and a third video. An uplink transmission procedure of the first video and an uplink transmission procedure of the second video are both borne by a first cell, while a downlink transmission procedure of the second video and a downlink transmission procedure of the third video are both borne by a second cell. The second cell is a cell different from or the same as the first cell.

For example, a process of determining a second position of the I-frame of the second video in an iterative manner includes: The network capability exposure platform determines a second position of the I-frame of the second video in an uplink direction based on a second position of the I-frame of the first video in the uplink direction, where a distance between the second position of the I-frame of the first video in the uplink direction and the second position of the I-frame of the second video in the uplink direction meets the condition; and the network capability exposure platform determines a second position of the I-frame of the second video in a downlink direction based on the second position of the I-frame of the second video in the uplink direction and a second position of the I-frame of the third video in the downlink direction, where the second position of the I-frame of the second video in the uplink direction and the second position of the I-frame of the third video in the downlink direction meet the condition.

Optionally, the second video is an initial video, and a second position of the I-frame of the second video is preset. Alternatively, a second position of the I-frame of the second video is determined in an iterative manner based on a second position of an I-frame of a video preceding the second video. A manner in which the second position of the I-frame of the second video is determined is the same as the manner in which the second position of the I-frame of the first video is determined.

When the network capability exposure platform arranges positions of I-frames, there are a plurality of arrangement aims, that is, degrees to which second positions of I-frames of videos are staggered. The following provides descriptions by using an arrangement aim 1 and an arrangement aim 2 as examples.

Arrangement Aim 1: Even Distribution

Even distribution means that there is a same distance between second positions of I-frames of any two adjacent videos in a cell, with the distance between second positions of I-frames of adjacent videos maximized. When the network capability exposure platform performs arrangement with an aim of achieving even distribution, a distance between second positions of I-frames of adjacent videos is equal to, for example, a ratio of an I-frame interval to a total quantity of videos borne in a cell.

For example, a first cell bears a first video and a second video. After the network capability exposure platform arranges first positions of I-frames of the first video and the second video, a distance between a second position of the I-frame of the second video and a second position of the I-frame of the first video is equal to a ratio of an I-frame interval to a total quantity of videos borne by the first cell.

Optionally, when positions of I-frames are arranged with transmission directions of videos considered: If a first video and a second video are both uplink videos borne by a first cell, a distance between a second position of an I-frame of the second video and a second position of an I-frame of the first video is equal to a ratio of an I-frame interval to a total quantity of uplink videos borne by the first cell; or if a first video and a second video are both downlink videos borne by a first cell, a distance between a second position of an I-frame of the second video and a second position of an I-frame of the first video is equal to a ratio of an I-frame interval to a total quantity of downlink videos borne by the first cell.

With the arrangement aim 1, I-frames of a plurality of videos can be evenly arranged at a radio air interface with a largest spacing.

Arrangement Aim 2: Distribution at Intervals of a Specific Spacing

Distribution at intervals of a specific spacing means that a distance between second positions of I-frames of two adjacent videos in a cell is equal to the specific spacing. In a possible implementation, the specific spacing is related to an I-frame tolerable transmission duration. The following provides descriptions by using two implementations as examples.

In a possible implementation, the specific spacing is the I-frame tolerable transmission duration. For example, after a first position of an I-frame of a first video and a first position of an I-frame of a second video are arranged, a distance between a second position of the I-frame of the second video and a second position of the I-frame of the first video is equal to the I-frame tolerable transmission duration.

In another possible implementation, the specific spacing is greater than the I-frame tolerable transmission duration. For example, the specific spacing is a product of the I-frame tolerable transmission duration and a specific coefficient, with the specific coefficient greater than 1. For example, after a first position of an I-frame of a first video and a first position of an I-frame of a second video are arranged, a distance between a second position of the I-frame of the second video and a second position of the I-frame of the first video is equal to a product of the I-frame tolerable transmission duration and a specific coefficient.

In the manner, because the I-frame tolerable transmission duration is considered when the I-frames are arranged, quality of service of the videos being affected is avoided, while it is ensured that the I-frames of the plurality of videos are staggered at a radio air interface.

How selecting between the arrangement aim 1 and the arrangement aim 2 is performed is not limited in this embodiment. In a possible implementation, whether the arrangement aim 1 or the arrangement aim 2 is used is determined based on expected effect that the two arrangement aims can achieve. For example, the network capability exposure platform determines a ratio of an I-frame interval to a total quantity of videos borne in a cell based on the total quantity of the videos borne in the cell, and compares the ratio with a specific spacing. If the ratio of the I-frame interval to the total quantity of the videos borne in the cell is greater than the specific spacing, that is, first positions of I-frames of the different videos can be spaced more widely when the arrangement aim 1 is used, the arrangement aim 1 is selected. If the ratio of the I-frame interval to the total quantity of the videos borne in the cell is less than the specific spacing, that is, first positions of I-frames of the different videos can be spaced more widely when the arrangement aim 2 is used, the arrangement aim 2 is selected.

After positions of I-frames are arranged, a plurality of possible results are obtained. The following provides descriptions by using an arrangement result 1 to an arrangement result 3 as examples.

Arrangement Result 1: Amount of Adjustment for a Position of an I-Frame

An amount of adjustment for a position of an I-frame is a difference between a second position of the I-frame and a recognized first position of the I-frame. For example, after arranging a position of an I-frame of a first video, the network capability exposure platform obtains an amount of adjustment that is for the position of the I-frame of the first video.

Optionally, an amount of adjustment is an amount of time adjustment. For example, an arrangement result is to perform adjustment by xx milliseconds. Alternatively, an amount of adjustment is an amount of frame adjustment. For example, an arrangement result is to perform adjustment by xx video frames.

Alternatively, an arrangement result is not an amount of adjustment that is for a position of an I-frame, but an index corresponding to an amount of adjustment. For example, all possible amounts of adjustment that are for a position of an I-frame are quantized in advance, and a corresponding index is assigned to each amount of adjustment. After arranging a first position of an I-frame of a first video, the network capability exposure platform obtains, based on correspondences between amounts of adjustment and indexes, an index corresponding to an amount of adjustment that is for the first position of the I-frame of the first video.

Arrangement Result 2: Direction of Adjustment for a Position of an I-Frame

Directions of adjustment include a forward direction and a backward direction. The forward direction means to adjust a position of an I-frame to an earlier position (that is, to generate an I-frame in advance). The backward direction means to adjust a position of an I-frame to a later position (that is, to postpone generation of an I-frame).

Optionally, a direction of adjustment for a position of an I-frame is indicated by whether an amount of adjustment is positive or negative. For example, when an amount of adjustment for a position of an I-frame of a first video in an arrangement result is positive, it indicates to adjust the position of the I-frame of the first video to a later position; and when an amount of adjustment for a position of an I-frame of a first video in an arrangement result is negative, it indicates to adjust the position of the I-frame of the first video to an earlier position.

Arrangement Result 3: Adjustment Amount Range Corresponding to an Amount of Adjustment that is for a Position of an I-Frame Optionally, an adjustment amount range includes a starting position or an ending position of the adjustment amount range. For example, when an arrangement result for a position of an I-frame of a first video includes a time offset 1 (a starting position of an adjustment amount range), it is equivalent to indicating to adjust the position of the I-frame of the first video from the time offset 1.

When an amount of adjustment or an adjustment amount range is determined for a position of an I-frame, there are a plurality of cases for a parameter based on which the determining is performed. The following provides descriptions by using a parameter 1 to a parameter 3 as examples. Parameter 1: Total Quantity of Videos Borne in a Radio Cell For example, when a first video is borne by a first cell, an amount of adjustment or an adjustment amount range for a position of an I-frame of the first video is related to a total quantity of videos borne by the first cell.

For example, when an uplink transmission procedure of a first video is borne by a first cell, an amount of adjustment or an adjustment amount range for a position of an I-frame of the first video is related to a total quantity of uplink videos borne by the first cell.

For example, when a downlink transmission procedure of a first video is borne by a first cell, an amount of adjustment or an adjustment amount range for a position of an I-frame of the first video is related to a total quantity of downlink videos borne by the first cell.

Parameter 2: I-Frame Tolerable Transmission Duration

For example, an amount of adjustment or an adjustment amount range for a position of an I-frame of a first video is related to an I-frame tolerable transmission duration of the first video. For another example, when a first video is borne by a first cell, an amount of adjustment for a position of an I-frame of the first video is related not only to an I-frame tolerable transmission duration of the first video but also to I-frame tolerable transmission durations of other videos borne by the first cell.

Parameter 3: Frame Rate and I-Frame Interval

For example, an amount of adjustment or an adjustment amount range for a position of an I-frame of a first video is related to a frame rate and an I-frame interval of the first video.

The foregoing provides descriptions by using an example in which the network capability exposure platform independently performs a function of arranging a position of an I-frame. In some other embodiments, joint arrangement is supported. To be specific, the network capability exposure platform and other entities collaborate together to arrange a position of an I-frame. The following describes possible implementations of joint arrangement by using examples.

In a possible implementation, joint arrangement is equivalent to that different entities perform segmental arrangement, or different entities perform arrangement at different granularities.

For example, the network capability exposure platform and a video capturing device management platform perform joint arrangement. In a possible implementation, the network capability exposure platform is responsible for determining an adjustment amount range for a position of an I-frame and sending the adjustment amount range to the video capturing device management platform, and the video capturing device management platform further arranges the position of the I-frame based on the adjustment amount range, to obtain an amount of adjustment that is for the position of the I-frame of a video.

In the joint arrangement manner, it is equivalent to that the network capability exposure platform provides the video capturing device management platform with a plurality of options for an amount of adjustment, and the video capturing device management platform is allowed to flexibly determine a specific amount of adjustment for a position of an I-frame of a particular video in a range of an adjustment amount range.

There are a plurality of application scenarios to which joint arrangement is applicable. The following describes application scenarios to which joint arrangement is applicable by using a joint arrangement scenario 1 and a joint arrangement scenario 2 as examples.

Joint arrangement scenario 1: A plurality of video capturing devices work in a radio cell, and management planes of the different video capturing devices are independent of each other.

For example, video capturing devices from different vendors are deployed in a cell, and these video capturing devices are managed by management platforms of their respective vendors, respectively.

In an example application scenario, a first video capturing device and a second video capturing device both work in a first cell. The first video capturing device is managed by a first management platform, and the second video capturing device is managed by a second management platform. The first video capturing device and the second video capturing device transmit three videos concurrently in the first cell, with the three videos being a first video, a second video, and a third video. Of the three videos, the first video and the second video are generated by the first video capturing device, and the third video is generated by the second video capturing device. After the network capability exposure platform arranges positions of I-frames of the three videos, an arrangement result obtained includes a first adjustment amount range and a second adjustment amount range. A range of the first adjustment amount range includes an amount of adjustment that is for the position of the I-frame of the first video and an amount of adjustment that is for the position of the I-frame of the second video. A range of the second adjustment amount range includes an amount of adjustment that is for the position of the I-frame of the third video. The network capability exposure platform sends the first adjustment amount range to the first management platform and the second adjustment amount range to the second management platform. The first management platform arranges the positions of the I-frames based on the first adjustment amount range, the position of the I-frame of the first video, and the position of the I-frame of the second video, to obtain the amount of adjustment that is for the position of the I-frame of the first video and/or the amount of adjustment that is for the position of the I-frame of the second video. The first management platform arranges the position of the I-frame based on the second adjustment amount range and the position of the I-frame of the third video, to obtain the amount of adjustment that is for the position of the I-frame of the third video.

Joint arrangement scenario 2: A plurality of video capturing devices are connected to a terminal-side device.

For example, a plurality of cameras (video capturing devices) are connected to CPE (a terminal-side device). The plurality of cameras transmit their generated videos concurrently to the CPE. A video stream sent by the CPE to a radio air interface is equivalent to a result of video streams of the plurality of cameras being superimposed, with the result including a video stream generated by each of the plurality of cameras.

In the scenario 2, the network capability exposure platform optionally does not need to distinguish between different video capturing devices connected to a terminal-side device, equivalent to considering videos of all the video capturing devices connected to the terminal-side device as a whole. The network capability exposure platform determines an adjustment amount range for all the videos concurrently transmitted by the terminal-side device. A video capturing device management platform determines, based on the adjustment amount range for each video capturing device connected to the terminal-side device, an amount of adjustment that is for a position of an I-frame.

It is optional that the network capability exposure platform performs joint arrangement with a video capturing device management platform. In some other embodiments, the network capability exposure platform does not perform joint arrangement with a video capturing device management platform but with another entity. For example, the network capability exposure platform performs joint arrangement with a video capturing device.

Step S505: The network capability exposure platform sends indication information to a video capturing device management platform.

The indication information is also referred to as capability exposure information. The indication information is used to indicate the video capturing device management platform to adjust positions of I-frames of videos for video capturing devices managed by the video capturing device management platform. The indication information is generated in a plurality of implementations. In a possible implementation, the network capability exposure platform generates the indication information based on an arrangement result after arranging positions of I-frames.

In some embodiments, the indication information indicates to adjust a position of an I-frame of a first video in a first cell from a first position of the I-frame of the first video to a second position of the I-frame of the first video. The first position of the I-frame of the first video is different from the second position of the I-frame of the first video. For example, before adjustment is performed, a distance between the first position of the I-frame of the first video and a first position of an I-frame of another video in the first cell does not meet the condition. For example, the first position of the I-frame of the first video and the first position of the I-frame of the another video in the first cell overlap. In this case, the I-frame of the first video and the I-frame of the another video may encounter peak-peak superimposition, resulting in an increase in demands for bandwidths. In other words, the I-frame of the first video may cause a collision between the I-frames. In this case, the second position of the I-frame of the first video is determined, and the position of the I-frame of the first video is indicated to be adjusted from the first position of the I-frame of the first video to the second position of the I-frame of the first video, so that the position of the I-frame of the first video and a position of the I-frame of the another video in the first cell are staggered. For example, a distance between the second position of the I-frame of the first video and a second position of the I-frame of the another video in the first cell meets the condition.

For example, after positions of I-frames of a video A and a video B are arranged, the following is found: A position (a second position) that is of the I-frame of the video A and that is obtained from the arrangement is the same as an original position (a first position) of the I-frame, while a position (a second position) that is of the I-frame of the video B and that is obtained from the arrangement is different from an original position (a first position) of the I-frame. In this case, the position of the I-frame of the video B is indicated to be adjusted. In this example, the video B is, for example, the first video.

For another example, when positions of I-frames of a video A and a video B are arranged, the following is performed: With an original position of the I-frame of the video A (that is, a first position of the I-frame of the video A) as a reference and the position of the I-frame of the video A kept unchanged, the position of the I-frame of the video B is adjusted, so that a post-adjustment position of the I-frame of the video B and the original position of the I-frame of the video A are staggered. In this way, the post-adjustment position (a second position) of the I-frame of the video B is obtained. In this example, the video B is, for example, the first video.

There are a plurality of cases for content included in the indication information. The following describes content that may be included in the indication information, by using a case 1 to a case 3 as examples. The case 1 to the case 3 may be combined in any manner to form the content of the indication information.

Case 1: The indication information includes an arrangement result that is obtained from arrangement of positions of I-frames.

For example, the indication information includes an amount of adjustment that is for a position of an I-frame of a video. For another example, the indication information includes an adjustment amount range corresponding to an amount of adjustment that is for a position of an I-frame of a video. By carrying an arrangement result, the indication information indicates a management platform to adjust, based on the arrangement result, the position of the I-frame of the video.

Case 2: The indication information includes an identifier of a video.

For example, the indication information includes an identifier of the first video and an amount of adjustment that is for the position of the I-frame of the first video.

Case 3: The indication information includes a first position of an I-frame of a video.

In an example application scenario, the network capability exposure platform receives first positions of I-frames of a plurality of videos recognized by a terminal-side device or a system device, and the network capability exposure platform performs arrangement based on the first positions of the I-frames, to obtain an adjustment amount range corresponding to an amount of adjustment that is for a position of an I-frame of a first video. Then, the network capability exposure platform sends the adjustment amount range and the first position of the I-frame of the first video to a video capturing device management platform. The video capturing device management platform arranges the first positions of the I-frames based on the first positions of the I-frames recognized by the terminal-side device or the system device and based on the adjustment amount range provided by the network capability exposure platform, to obtain the amount of adjustment that is for the first position of the I-frame of the first video.

Step S507: The video capturing device management platform receives the indication information.

Step S509: The video capturing device management platform obtains, based on the indication information, an amount of adjustment that is for a position of an I-frame.

Regarding how the video capturing device management platform obtains an amount of adjustment that is for a position of an I-frame, there are a plurality of cases. The following provides descriptions by using a case 1 and a case 2 as examples.

Case 1: The network capability exposure platform arranges positions of I-frames independently.

In the case 1, optionally, the indication information carries a specific amount of adjustment that is for a position of an I-frame. For example, the indication information carries the amount of adjustment that is for the position of the I-frame of the first video. The network capability exposure platform obtains the amount of adjustment that is for the position of the I-frame of the first video and that is carried in the indication information.

Case 2: The network capability exposure platform and the video capturing device management platform perform joint arrangement.

In the case 2, optionally, the indication information carries an adjustment amount range corresponding to an amount of adjustment that is for a position of an I-frame. For example, the indication information carries an adjustment amount range corresponding to the amount of adjustment that is for the position of the I-frame of the first video. The network capability exposure platform obtains the adjustment amount range carried in the indication information, and determines, based on the adjustment amount range and the first position of the I-frame of the first video, the amount of adjustment that is for the first position of the I-frame of the first video.

Step S511: The video capturing device management platform sends an adjustment command to a video capturing device.

The adjustment command is used to instruct to adjust the first position of the I-frame of the first video to the second position of the I-frame of the first video. The adjustment command carries the amount of adjustment that is for the position of the I-frame of the first video. The video capturing device is a data source of the first video.

Step S513: The video capturing device adjusts the first position of the I-frame of the first video to the second position of the I-frame of the first video based on the adjustment command.

According to the method provided in the foregoing embodiment, after procedures such as obtaining positions of I-frames of videos, arranging first positions of the I-frames, and indicating the video capturing device management platform to adjust a first position of an I-frame of a video are performed, the I-frames of the videos are staggered at a radio air interface, reducing impact of peak-peak superimposition of the I-frames of the videos, and reducing demands for wireless network bandwidths from the plurality of videos.

Further, a problem that I-frames of videos collide is resolved on a per-cell basis, with I-frames arranged for each cell. In this way, the arrangement is performed at a finer granularity, redundancy of transmission bandwidths is avoided, and resource utilization is improved. In addition, in a scenario with many video capturing devices and many cells, I-frames of videos are spaced more widely, reducing both difficulty of arrangement and the processing overheads of the algorithm.

By using some instances, the following describes the method shown in FIG. 5. Capability exposure information in the following instances is the indication information in the embodiment shown in FIG. 5. A position of an I-frame in the following instances is optionally the first position of the I-frame in the embodiment shown in FIG. 5. A target position of an I-frame in the following instances is optionally the second position of the I-frame in the embodiment shown in FIG. 5.

The following instances provide methods for reducing demands for wireless network bandwidths from a plurality of videos, and all relate to the following procedures.

(1) Configuration: Each video capturing device management platform notifies a network capability exposure platform of the following information: an identifier (for example, an IP address of a video capturing device+a video group number) of each video managed by the video capturing device management platform, and information corresponding to the video such as a bit rate, a frame rate, an I-frame interval, and an I-frame tolerable transmission duration.

(2) Mapping: The network capability exposure platform binds each video identifier to a corresponding radio air interface user, further determines a radio air interface user corresponding to each video, and a cell in which the radio air interface user is located, and notifies corresponding terminal-side devices or system devices of wireless communication of associated video-related parameters.

(3) Recognition: The terminal-side devices or system devices of wireless communication recognize positions of I-frames of the videos based on characteristics of periodic bursts of heavy traffic, and report the positions of the I-frames of the videos to the network capability exposure platform.

(4) Arrangement: The network capability exposure platform arranges I-frames of a plurality of videos in each cell, so that target positions of the I-frames of the plurality of videos are staggered at a radio air interface. If the arrangement helps reduce collisions between the I-frames of the videos, the network capability exposure platform sends capability exposure information to corresponding video capturing device management platforms. In some embodiments, some arrangement functions are optionally performed by the video capturing device management platforms.

(5) Control: The video capturing device management platforms send, based on the received capability exposure information, a command of adjusting positions of I-frames of videos to related video capturing devices, and feed results back to the network capability exposure platform. The network capability exposure platform may further predict, adjust, and safeguard radio air interface resources.

(6) Repeating: The procedures (1) to (5) may be repeated depending on different cases. For example, when a configured video capturing device is powered on, the procedures (2) to (5) are repeated.

Instance 1

Figure 6:
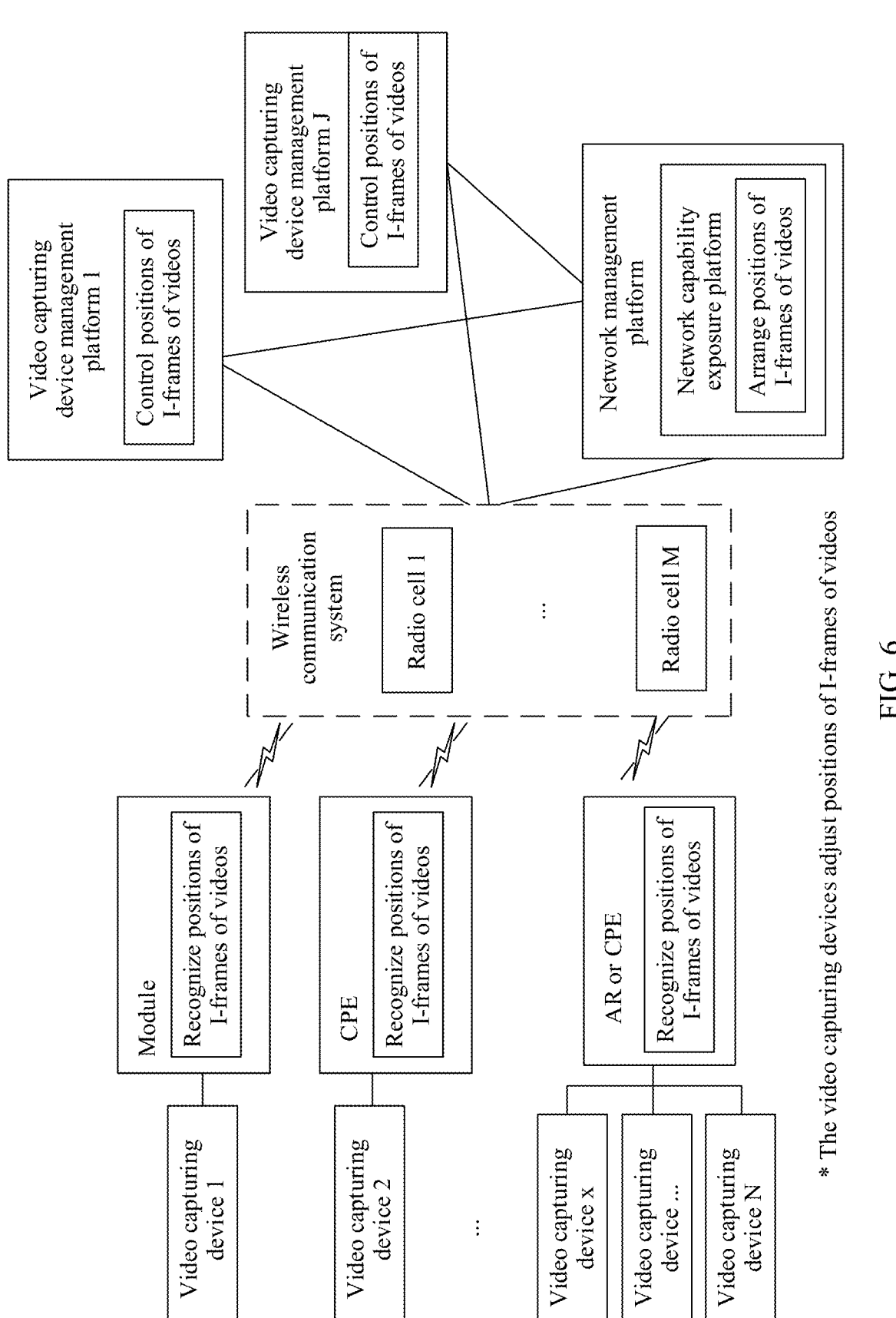
FIG. 6 is a schematic diagram of a solution to reducing demands for wireless network bandwidths from a plurality of videos according to an embodiment of this application.

For a scenario with a plurality of uplink videos, in technical solutions in the instance 1, a logical function of "recognizing positions of I-frames of videos" is located in terminal-side devices of wireless communication (for example, CPEs, modules, or ARs), while a logical function of "arranging positions of I-frames of videos" is located in a network capability exposure platform, with the network capability exposure platform located in a network management platform. FIG. 6 is a schematic diagram of the technical solutions in the instance 1.

The instance 1 relates to the following procedures and technical solutions.

(1) Each video capturing device management platform notifies the network capability exposure platform of the following information: an identifier (for example, an IP address of a video capturing device+a video group number) of each video managed by the video capturing device management platform, and information corresponding to the video such as a bit rate, a frame rate, an I-frame interval, and an I-frame tolerable transmission duration. The network capability exposure platform establishes relationships between the video identifiers and the video capturing device management platforms based on the information, and learns of related parameters corresponding to the videos.

(2) The network capability exposure platform binds each video identifier to a corresponding radio air interface user, further determines a radio air interface user to which each video capturing device is connected and a cell in which the radio air interface user is located, and notifies corresponding terminal-side devices of wireless communication (for example, modules or CPEs) of associated video-related parameters.

(3) The logical functions of "recognizing positions of I-frames of videos" in the terminal-side devices of wireless communication recognize timestamps t of I-frames of the videos based on characteristics of periodic bursts of heavy traffic. A timestamp t of an I-frame is represented by a system frame number (SFN) to which the I-frame corresponds at a radio air interface×10+a subframe index (the frame number ranges from 0 to 1023, and the subframe index ranges from 0 to 9), and expressed in milliseconds. Further, if frame rates of videos in a cell are all r and I-frame intervals of the videos are all d, a position of an I-frame of each video can be calculated based on a timestamp t of the I-frame of the video as follows: $t \bmod (1000 \times d/r)$. Then, the system devices of wireless communication send the video identifiers and the positions of the I-frames of the videos to the network capability exposure platform.

(4) The logical function of "arranging positions of I-frames of videos" in the network capability exposure platform arranges I-frames of a plurality of videos in each cell, obtains amounts of adjustment that are for positions of the I-frames of the videos, and then notifies corresponding video capturing device management platforms of the amounts of adjustment, so that target positions of the I-frames of the plurality of videos in the cell are evenly arranged at a radio air interface with a largest spacing. Specifically, for N videos with a frame rate of r and an I-frame interval of d in a cell, assuming that a position of an I-frame of an $n^{th}$ (n=0, . . . , N−1) video is tn, an amount of time adjustment for the position of the I-frame of the $n^{th}$ video can be calculated as follows: $(n \times d/N) \times (1000/r) - tn \bmod (1000 \times d/r)$. The amount of time adjustment is expressed in milliseconds. A positive value indicates backward adjustment, and a negative value indicates forward adjustment. An amount of frame adjustment can also be obtained through conversion that is performed based on the amount of time adjustment. If the arrangement helps reduce collisions between the I-frames of the videos, the network capability exposure platform may send the video identifiers, and amounts of time adjustment or amounts of frame adjustment together to the corresponding video capturing device management platforms as capability exposure information.

(5) Logical functions of "controlling positions of I-frames of videos" in the video capturing device management platforms send, based on the received capability exposure information, a command of adjusting positions of I-frames of videos to related video capturing devices, and feed results back to the network capability exposure platform. The network capability exposure platform may further predict, adjust, and safeguard radio air interface resources.

(6) The procedures (1) to (5) may be repeated depending on different cases. For example, when a configured video capturing device is powered on, the procedures (2) to (5) are repeated.

Figure 7:
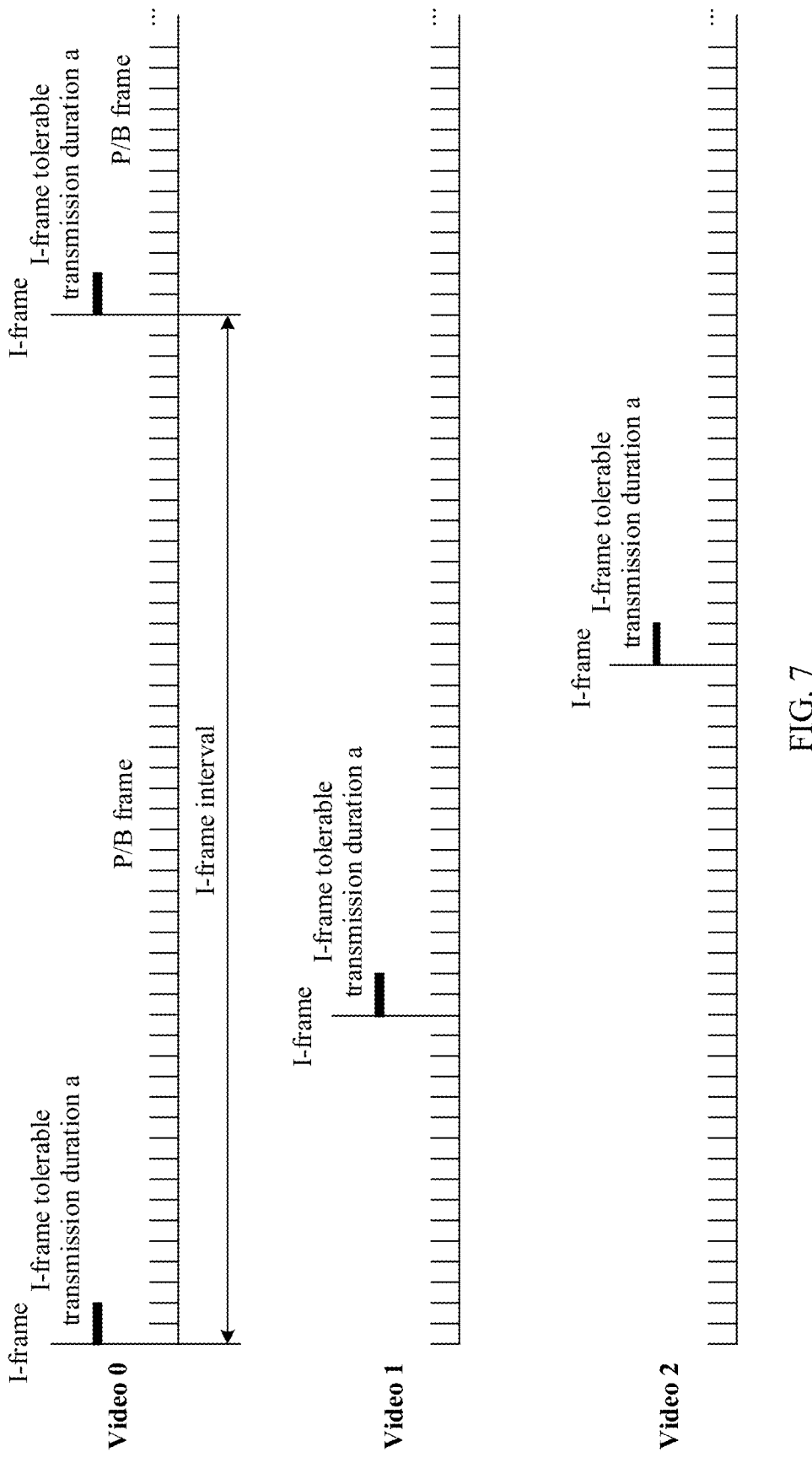
FIG. 7 is a schematic diagram of effect of staggering I-frames of a plurality of videos at a radio air interface according to an embodiment of this application.

For a purpose of definitely staggering the I-frames of the plurality of uplink videos at the air interface, procedures such as the following are performed in the instance 1: The terminal-side devices of wireless communication recognize the positions of the I-frames of the videos, the network capability exposure platform arranges the positions of the I-frames of the videos, and the video capturing device management platforms control the positions of the I-frames of the videos. In this way, the I-frames of the videos are evenly arranged at the radio air interface with a largest spacing, avoiding a problem that I-frames of a plurality of videos collide, and reducing demands for wireless network bandwidths. With three uplink videos being concurrently transmitted in a cell as an example, technical effects of the instance 1 are shown in FIG. 7. To be specific, I-frames of the three uplink videos are spaced at a radio air interface ⅓ of an I-frame interval of the videos apart.

The following problem is currently not resolved: how I-frames of a plurality of videos are prevented from colliding at an air interface of a cell while quality of service (for example, a latency) of the videos is ensured. In the instance 1, the procedures such as the following are performed: The terminal-side devices of wireless communication recognize the positions of the I-frames of the videos, the network capability exposure platform arranges the positions of the I-frames of the videos, and the video capturing device management platforms control the positions of the I-frames of the videos. In this way, the I-frames of the videos are evenly arranged at the radio air interface with a largest spacing.

Instance 2

For a scenario with a plurality of downlink videos, in technical solutions in the instance 2, a logical function of "recognizing positions of I-frames of videos" is located in system devices of wireless communication (for example, base stations or core network elements), while one part of a logical function of "arranging positions of I-frames of videos" is located in a network capability exposure platform and the other part is located in video capturing device management platforms, with the "network capability exposure platform" deployed separately.

Figure 8:
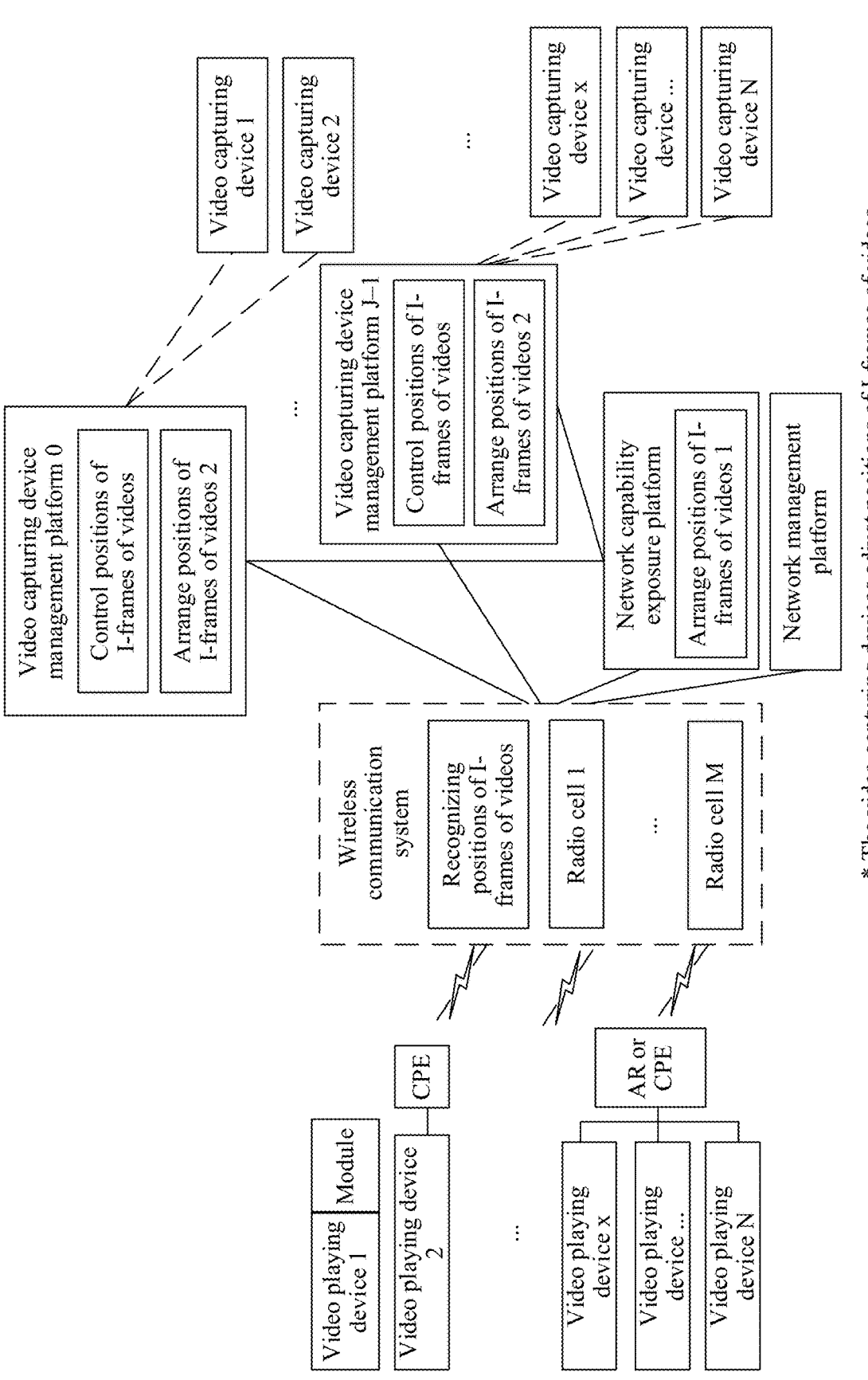
FIG. 8 is a schematic diagram of a solution to reducing demands for wireless network bandwidths from a plurality of videos according to an embodiment of this application.

FIG. 8 is a schematic diagram of the technical solutions in the instance 2. The instance 2 relates to the following procedures and technical solutions.

(1) Each video capturing device management platform notifies the network capability exposure platform of the following information: an identifier (for example, an IP address of a video capturing device+a video group number) of each video managed by the video capturing device management platform, and information corresponding to the video capturing device such as a bit rate, a frame rate, an I-frame interval, and an I-frame tolerable transmission duration. The network capability exposure platform establishes relationships between the video identifiers and the video capturing device management platforms based on the information, and learns of related parameters corresponding to the videos.

(2) The network capability exposure platform binds each video identifier to a corresponding radio air interface user, further determines a radio air interface user to which each video playing device is connected and a cell in which the radio air interface user is located, and notifies corresponding system devices of wireless communication (for example, base stations or core network elements) of associated video-related parameters.

(3) The logical functions of "recognizing positions of I-frames of videos" in the system devices of wireless communication recognize timestamps t of I-frames of the videos based on characteristics of periodic bursts of heavy traffic. A timestamp t of an I-frame is represented by a local time to which the I-frame corresponds at a radio air interface, and expressed in milliseconds. Further, if frame rates of videos in a cell are all r and I-frame intervals of the videos are all d, a position of an I-frame of each video can be calculated based on a timestamp t of the I-frame of the video as follows:

t mod $(1000 \times d/r)$. Then, the system devices of wireless communication send the video identifiers and the positions of the I-frames of the videos to the network capability exposure platform.

(4) The logical function of "arranging positions of I-frames of videos 1" in the network capability exposure platform arranges I-frames of a plurality of videos in each cell, obtains capability exposure information, and then notifies corresponding video capturing device management platforms of the capability exposure information, so that target positions of the I-frames of the plurality of videos in the cell are staggered at a radio air interface, with a spacing equal to an I-frame tolerable transmission duration a of the videos. Specifically, for N videos with a same frame rate and a same I-frame interval in a cell, assuming that a position of an I-frame of an $n^{th}$ $(n=0, \ldots, N-1)$ video is tn, and that Xj videos in the cell are managed by a video capturing device management platform j $(j=0, \ldots, j-1)$, a time offset Fj of the video capturing device management platform j may be defined as follows: F0=0, F1=X0, and Fj=sum $(X0+ \ldots +Xj-1) \times a$ $(j>1)$. To be specific, Fj is related to a total quantity of videos that are in the cell and that are managed by the video management platforms 0 to j-1. If the arrangement helps reduce collisions between the I-frames of the videos, the network capability exposure platform sends, based on group division in the cells, Fj, the video identifiers, and tn together to the corresponding video capturing device management platforms as the capability exposure information.

The logical functions of "arranging positions of I-frames of videos 2" in the video capturing device management platforms calculate, based on the received capability exposure information, amounts of time adjustment that are for the positions of the I-frames of the videos. For one of the cells, an amount of time adjustment for a starting position of an I-frame of a video is calculated as follows: $(Fj+i \times a)$ mod $(1000 \times d/r)-tn$. The amount of time adjustment is expressed in milliseconds. A positive value indicates backward adjustment, and a negative value indicates forward adjustment. An amount of frame adjustment can also be obtained through conversion that is performed based on the amount of time adjustment.

(5) Logical functions of "controlling positions of I-frames of videos" in the video capturing device management platforms send, based on information such as the amounts of adjustment that are for the positions of the I-frames of the videos, a command of adjusting positions of I-frames of videos to related video capturing devices, and feed results back to the network capability exposure platform. The network capability exposure platform may further predict, adjust, and safeguard radio air interface resources.

(6) The procedures (1) to (5) may be repeated depending on different cases. For example, when a radio air interface user changes a video to be viewed, the procedures (2) to (5) are repeated.

In an actual scenario, a plurality of radio air interface users may view a video simultaneously, causing a case in which a plurality of radio air interface users simultaneously adjust positions of I-frames of videos from a video capturing device. In this case, the logical function of "arranging positions of I-frames of videos" in the network capability exposure platform can still arrange all the videos together, to achieve an aim of staggering the I-frames of the videos at a radio air interface as much as possible.

Figure 9:
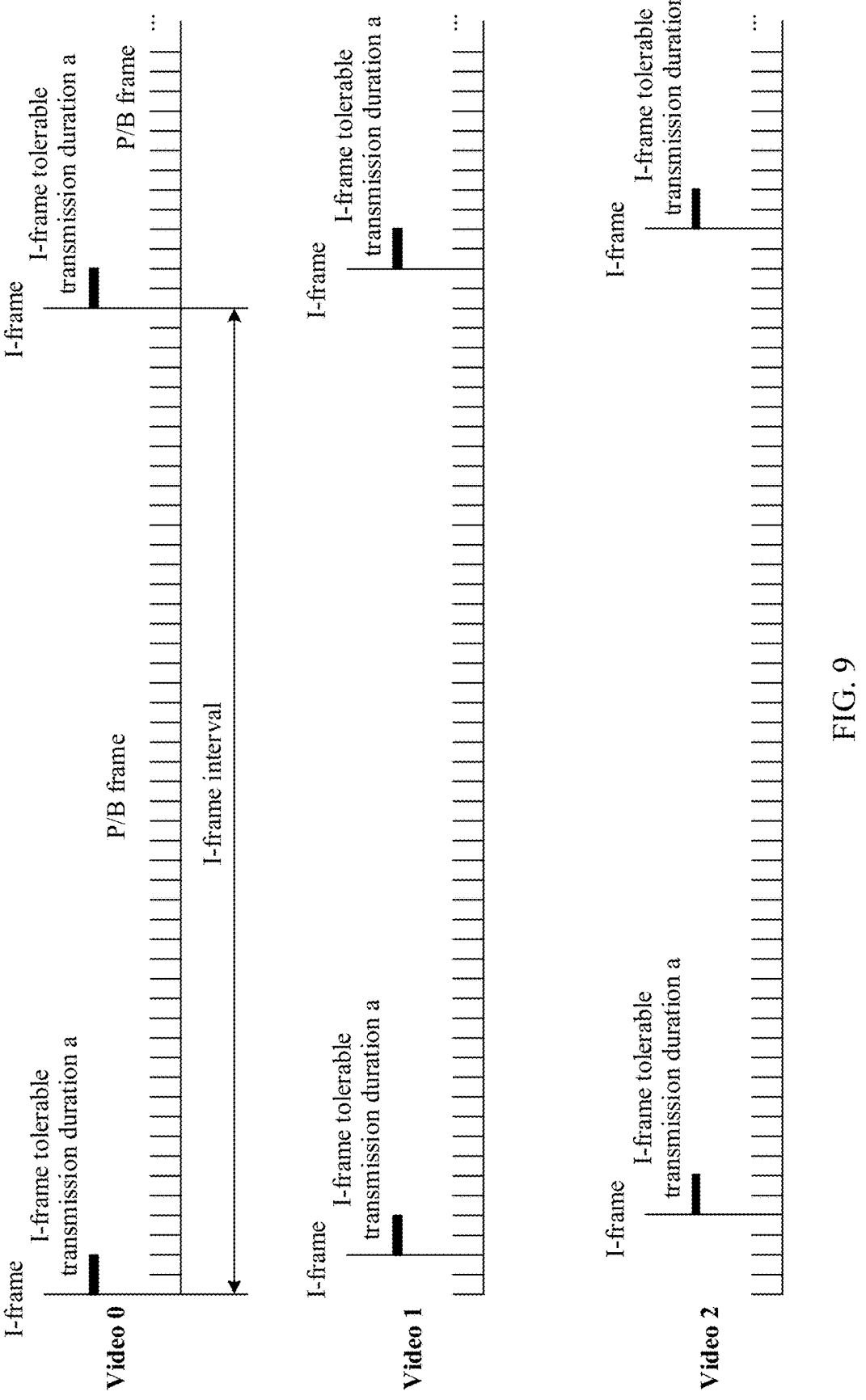
FIG. 9 is a schematic diagram of effect of staggering I-frames of a plurality of videos at a radio air interface according to an embodiment of this application.

For a purpose of definitely staggering the I-frames of the plurality of downlink videos at the air interface, procedures such as the following are performed in the instance 2: The system devices of wireless communication recognize the positions of the I-frames of the videos, the network capability exposure platform arranges the positions of the I-frames of the videos, and the video capturing device management platforms control the positions of the I-frames of the videos. In this way, the I-frames of the videos are staggered at the radio air interface with the spacing equal to the I-frame longest transmission duration a of the videos, avoiding a problem that I-frames of a plurality of videos collide, and reducing demands for wireless network bandwidths. With three downlink videos being concurrently transmitted in a cell as an example, technical effects of the instance 2 are shown in FIG. 9.

The following problem is currently not resolved: how I-frames of a plurality of videos are prevented from colliding at an air interface of a cell while quality of service (for example, a latency) of the videos is ensured. In the instance 2, the procedures such as the following are performed: The systems devices of wireless communication recognize the positions of the I-frames of the videos, the network capability exposure platform arranges the positions of the I-frames of the videos, and the video capturing device management platforms control the positions of the I-frames of the videos. In this way, the I-frames of the videos are staggered at the radio air interface, with the spacing equal to the I-frame tolerable transmission duration a of the videos.

Instance 3

When uplink transmission procedures and downlink transmission procedures of some videos are both borne by a wireless communication system, there is linkage between uplink videos and downlink videos. To be specific, adjustment of positions of I-frames of the videos affects both the uplink videos and the downlink videos. For the scenario, in technical solutions in the instance 3, a logical function of "recognizing positions of I-frames of videos" for the uplink videos is located in terminal-side devices of wireless communication (for example, modules, CPEs, or ARs) and a logical function of "recognizing positions of I-frames of videos" for the downlink videos is located in system devices of wireless communication (for example, base stations or core network elements), while a logical function of "arranging positions of I-frames of videos" is located in a network capability exposure platform, with the network capability exposure platform deployed separately.

Figure 10:
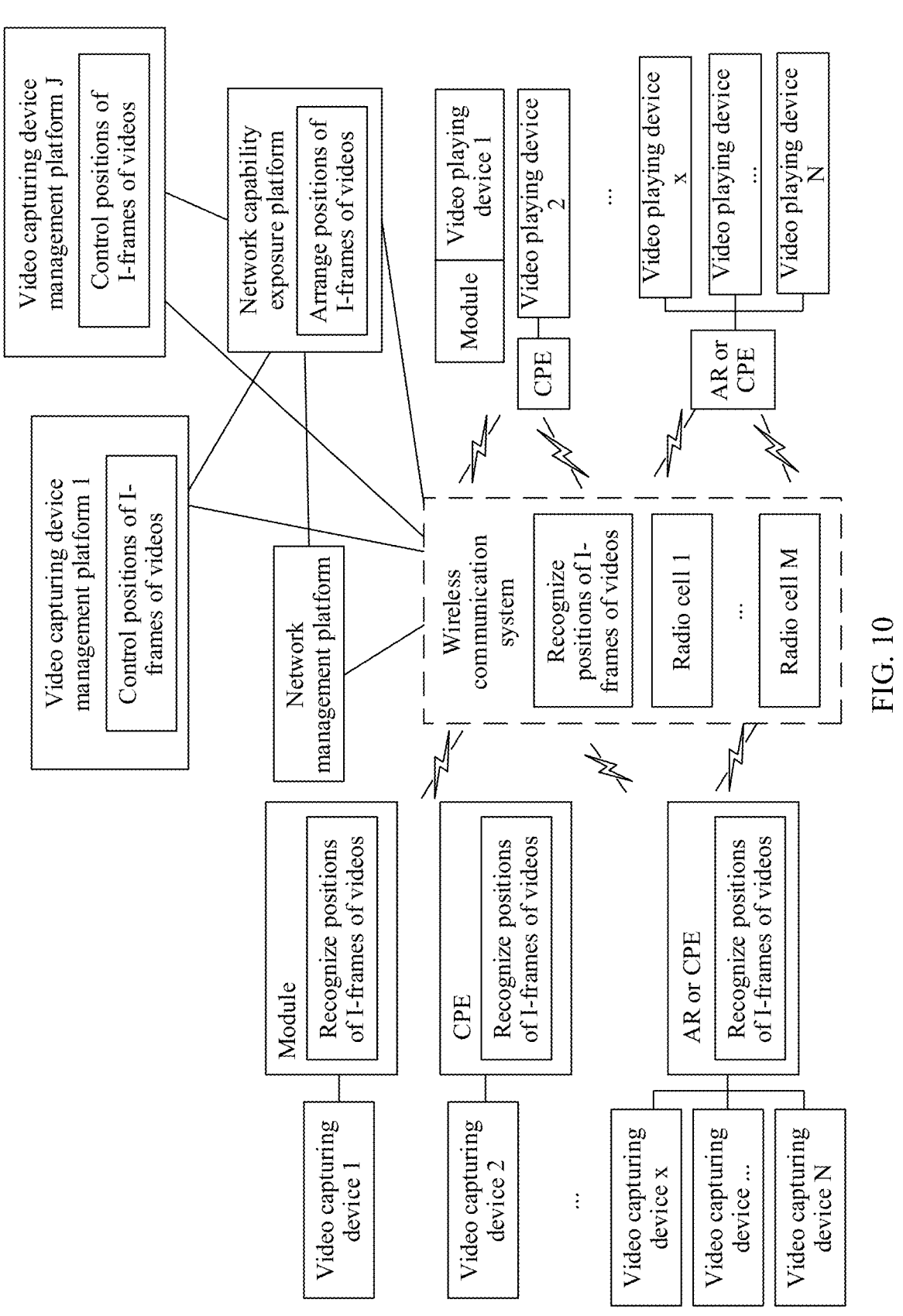
FIG. 10 is a schematic diagram of a solution to reducing demands for wireless network bandwidths from a plurality of videos according to an embodiment of this application.

FIG. 10 is a schematic diagram of the technical solutions in the instance 3. The instance 3 relates to the following procedures and technical solutions.

(1) Each video capturing device management platform notifies the network capability exposure platform of the following information: an identifier (for example, an IP address of a video capturing device+a video group number) of each video managed by the video capturing device management platform, and information corresponding to the video capturing device such as a bit rate, a frame rate, an I-frame interval, and an I-frame tolerable transmission duration. The network capability exposure platform establishes relationships between the video identifiers and the video capturing device management platforms based on the information, and learns of related parameters corresponding to the videos.

(2) The network capability exposure platform binds each video identifier to a corresponding radio air interface user. The corresponding radio air interface user may be a radio air interface user (corresponding to an uplink video) connected to a video capturing device or a radio air interface user (corresponding to a downlink video) connected to a video playing device, or may include both a radio air interface user connected to a video capturing device and a radio air interface user connected to a video playing device. Further, a cell in which the corresponding radio air interface user is located is also determined. The network capability exposure platform notifies corresponding terminal-side devices of wireless communication (for example, modules or CPEs) and corresponding system devices of wireless communication (for example, base stations or core network elements) of associated video-related parameters.

(3) For the radio air interface user connected to each video capturing device and the radio air interface user connected to each video playing device, the logical functions of "recognizing positions of I-frames of videos" in the terminal-side devices of wireless communication and the logical functions of "recognizing positions of I-frames of videos" in the system devices of wireless communication recognize timestamps t of I-frames of the videos based on characteristics of periodic bursts of heavy traffic, respectively. For the terminal-side devices of wireless communication, a timestamp t of an I-frame is represented by a system frame number (SFN) to which the I-frame corresponds at a radio air interface×10+a subframe index (the frame number ranges from 0 to 1023, and the subframe index ranges from 0 to 9). For the system devices of wireless communication, a timestamp t of an I-frame is represented by a local time to which the I-frame corresponds at a radio air interface. Both the timestamps are expressed in milliseconds. Further, if frame rates of videos in a cell are all r and I-frame intervals of the videos are all d, a position of an I-frame of each video can be calculated based on a timestamp t of the I-frame of the video as follows: $t \bmod (1000 \times d/r)$. Then, the system devices of wireless communication send the video identifiers and the positions of the I-frames of the videos to the network capability exposure platform.

(4) The logical function of "arranging positions of I-frames of videos" in the network capability exposure platform arranges I-frames of a plurality of videos in each cell, obtains amounts of adjustment that are for positions of the I-frames of the videos, and then notifies corresponding video capturing device management platforms of the amounts of adjustment, so that target positions of the I-frames of the plurality of videos in the cell are staggered at a radio air interface, with a spacing greater than or equal to an I-frame tolerable transmission duration a of the videos. The I-frame tolerable transmission duration a is assumed to be 100 ms herein. In the following, an iterative method is used to obtain the amounts of adjustment that are for the positions of the I-frames of the videos.

First, the following table may be obtained based on the foregoing information, with specific values being merely examples.

Second, the iterative method is used to obtain target positions of the I-frames of the videos. For a cell with videos whose frame rates r are all 20 and I-frame intervals d are all 50, there are 25 (1000×50/20/100=25) candidate positions for I-frames of the videos. An uplink video may be selected as an initial video. Herein, the video with the video identifier of 0 in the table above is selected, and a target position of an I-frame of an uplink video of the video in the cell 0 is set to 0. In this case, an amount of time adjustment for a position of the I-frame of the video is −1895 milliseconds (0−1895=−1895). Then, after the position of the I-frame is adjusted, a target position of an I-frame of a downlink video of the video in the cell 2 changes to 713 milliseconds ((108−1895) mod (1000×50/20)=713). Next, a target position of an I-frame of the video with the video identifier of 1 is determined. A target position of an I-frame of an uplink video of the video in the cell 0 is preset to 100 milliseconds. It can be inferred that an amount of time adjustment for a position of the I-frame of the video is 88 milliseconds (100−12=88). Then, after the position of the I-frame is adjusted, a target position of an I-frame of a downlink video of the video in the cell 2 changes to 247 milliseconds ((159+88) mod (1000×50/20)=247). In this case, it can be found that the downlink videos in the cell 2 do not encounter an I-frame collision. Therefore, the target position of the I-frame of the video with the video identifier of 1 is determined. Next, a target position of an I-frame of the video with the video identifier of 2 is determined. In the cell 1 in which the uplink video is located, no target positions are determined for I-frames of other videos so far. Therefore, a target position of an I-frame of the uplink video of the video in the cell 1 may be preset to 0 milliseconds. It can be inferred that an amount of time adjustment for a position of the I-frame of the video is −98 milliseconds (0−98=−98). Then, after the position of the I-frame is adjusted, a target position of an I-frame of a downlink video of the video in the cell 2 changes to 192 milliseconds ((290−98) mod (1000×50/20)=192). In this case, it can be found that an I-frame collision occurs between the downlink video with the video identifier of 2 and the downlink video with the video identifier of 1 in the cell 2. Further, a target position of the I-frame of the uplink video of the video in the cell 1 is preset in steps of 100 ms, until a target position of the I-frame is found so that neither the uplink video nor the downlink video of the video encounters an I-frame collision. When a target position of the I-frame of the uplink video of the video in the cell 1 is preset to 200 milliseconds, it can be inferred that an amount of time adjustment for the position of the I-frame of the video is 102 milliseconds (200−98=102). Then, after the position of the I-frame is adjusted, a target position of the I-frame of the downlink video of the video in the cell 2 changes to 392 milliseconds ((290+102) mod (1000×50/20)=392). In this case, it can be found that the downlink

| | | Uplink video | | | Downlink video | | |
|---|---|---|---|---|---|---|---|
| Video identifier | Video capturing device management platform | Radio air interface user | Cell in which a radio air interface user is located | Position of an I-frame of a video | Radio air interface user | Cell in which a radio air interface user is located | Position of an I-frame of a video |
| 0 | 0 | 0 | 0 | 1895 | 6 | 2 | 108 |
| 1 | 0 | 1 | 0 | 12 | 7 | 2 | 159 |
| 2 | 0 | 2 | 1 | 98 | 8 | 2 | 290 | videos in the cell 2 do not encounter an I-frame collision. Therefore, the target position of the I-frame of the video with the video identifier of 2 is determined. In conclusion, the amount of time adjustment for the position of the I-frame of the video with the video identifier of 0 is −1895 milliseconds, the amount of time adjustment for the position of the I-frame of the video with the video identifier of 1 is 88 milliseconds, and the amount of time adjustment for the position of the I-frame of the video with the video identifier of 2 is 102 milliseconds. A positive value indicates backward adjustment, and a negative value indicates forward adjustment. An amount of frame adjustment can also be obtained through conversion that is performed based on the amount of time adjustment.

If the arrangement helps reduce collisions between the I-frames of the videos, the network capability exposure platform may send the video identifiers, and amounts of time adjustment or amounts of frame adjustment together to the corresponding video capturing device management platforms as capability exposure information.

(5) Logical functions of "controlling positions of I-frames of videos" in the video capturing device management platforms send, based on the received capability exposure information, a command of adjusting positions of I-frames of videos to related video capturing devices, and feed results back to the network capability exposure platform. The network capability exposure platform may further predict, adjust, and safeguard radio air interface resources.

(6) The procedures (1) to (5) may be repeated depending on different cases. For example, when a radio air interface user changes a video to be viewed, the procedures (2) to (5) are repeated.

For the scenario in which uplink transmission procedures and downlink transmission procedures of some videos are both borne by a wireless communication system, for a purpose of definitely staggering the I-frames of the plurality of videos at the air interfaces, procedures such as the following are performed in the instance 3: The terminal-side devices of wireless communication recognize the positions of the I-frames of the videos, the system devices of wireless communication recognize the positions of the I-frames of the downlink videos, the network capability exposure platform arranges the positions of the I-frames of the uplink videos and the downlink videos together, and the video capturing device management platforms control the positions of the I-frames of the videos. In this way, the I-frames of the videos are staggered at the radio air interfaces, with the spacing greater than or equal to the I-frame tolerable transmission duration a of the videos.

Figure 11:
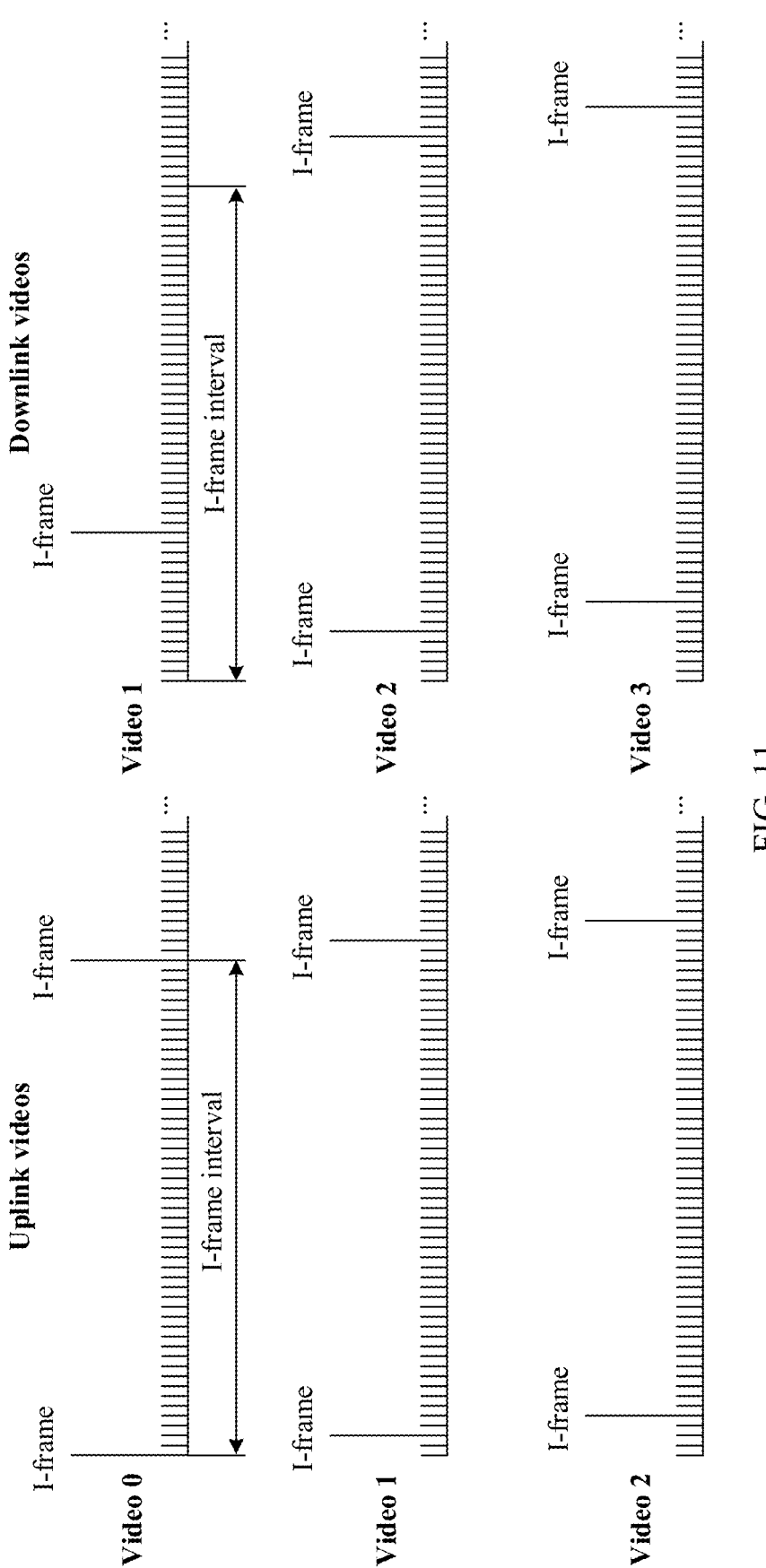
FIG. 11 is a schematic diagram of effect of staggering I-frames of a plurality of videos at a radio air interface according to an embodiment of this application.

Using a system with three videos as an example, and assuming that uplink video users with video identifiers of 0 and 1 are in a cell 1, an uplink video user with a video identifier of 3 is in a cell 1, and downlink video users with video identifiers of 0, 1, and 2 are in a cell 2, technical effects of the instance 1 are shown in FIG. 11. To be specific, I-frames of the videos are staggered at a radio air interface of any cell with a spacing greater than or equal to an I-frame tolerable transmission duration a of the videos, avoiding a problem that I-frames of a plurality of videos collide, and reducing demands for wireless network bandwidths.

The following problem is currently not resolved: how I-frames of a plurality of videos are prevented from colliding at an air interface of a cell while quality of service (for example, a latency) of the videos is ensured. In the instance 3, the procedures such as the following are performed: The terminal-side devices of wireless communication recognize the positions of the I-frames of the uplink videos, the system devices of wireless communication recognize the positions of the I-frames of the downlink videos, the network capability exposure platform arranges the positions of the I-frames of the uplink videos and the downlink videos together, and the video capturing device management platforms control the positions of the I-frames of the videos. In this way, the I-frames of the videos are staggered at the radio air interfaces, with the spacing greater than or equal to the I-frame tolerable transmission duration of the videos.

The foregoing instances relate to six steps: configuration, mapping, recognition, arrangement, control, and repeating, with configuration and mapping being pre-steps, recognition and arrangement being main steps, and control and repeating being post-steps. A recognition part is located in a wireless communication system, while an arrangement part is located in a network capability exposure platform. In the instance 2, some arrangement functions are alternatively performed by video capturing device management platforms, and collaborate with an arrangement function in the network capability exposure platform to complete arrangement.

(1) Recognition: Terminal-side devices or system devices of wireless communication recognize positions of I-frames of videos based on characteristics of periodic bursts of heavy traffic, and report the positions of the I-frames of the videos to the network capability exposure platform.

(2) Arrangement: The network capability exposure platform arranges I-frames of a plurality of videos in each cell, so that target positions of the I-frames of the plurality of videos are staggered at a radio air interface. Then, the network capability exposure platform sends capability exposure information to corresponding video capturing device management platforms. During specific implementation, alternatively, some arrangement functions are optionally performed by video capturing device management platforms. A specific arrangement method includes the following (2-a) to (2-c).

(2-a) I-frames of uplink videos in a cell are evenly distributed (described in the instance 1), distributed at intervals of a specific spacing, or may be arranged using another algorithm that is not covered, in the cell.

(2-b) I-frames of downlink videos in a cell are distributed at intervals of a specific spacing, evenly distributed, or may be arranged using another algorithm that is not covered, in the cell. (That I-frames of downlink videos in a cell are distributed at intervals of a specific spacing is described in the instance 2. In addition, the following is provided: In an actual scenario, a plurality of radio air interface users may view a video simultaneously, causing a case in which a plurality of radio air interface users simultaneously adjust positions of I-frames of videos from a video capturing device. In this case, a logical function of "arranging positions of I-frames of videos" in the network capability exposure platform can still arrange all the videos together, to achieve an aim of staggering the I-frames of the videos at a radio air interface as much as possible. A similar iterative algorithm is described in the instance 3. In essence, there may be many algorithms, and it is difficult to exhaust them. Therefore, detailed examples are not provided.)

(2-c) When an uplink transmission procedure and a downlink transmission procedure of a video are both borne by a wireless communication system, there is linkage between an uplink video and a downlink video. To be specific, adjustment of a position of an I-frame of the video affects both the uplink video and the downlink video. In the instance 3, iterative arrangement is performed regarding this case. However, there may be many algorithms in essence, and it is difficult to exhaust them.

After the foregoing procedures are performed, I-frames of a plurality of videos are definitely staggered at a radio air interface, with quality of service of the videos not affected, resolving a peak-to-average ratio problem facing a plurality of videos, and reducing demands for wireless network bandwidths from a plurality of videos.

Figure 12:
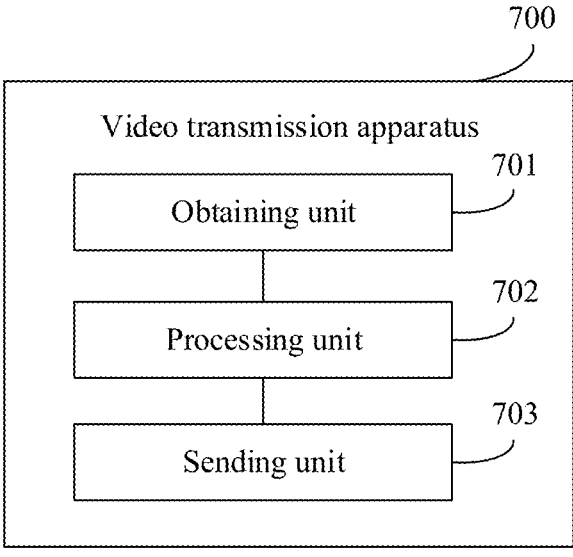
FIG. 12 is a schematic diagram of a structure of a video transmission apparatus 700 according to an embodiment of this application.

FIG. 12 is a schematic diagram of a structure of a video transmission apparatus 700 according to an embodiment of this application. The video transmission apparatus 700 shown in FIG. 12 includes an obtaining unit 701, a processing unit 702, and a sending unit 703.

Optionally, with reference to the system architecture shown in FIG. 4, the video transmission apparatus 700 shown in FIG. 12 is disposed on the network capability exposure platform in FIG. 4.

Optionally, with reference to the method flow shown in FIG. 5, the video transmission apparatus 700 shown in FIG. 12 is disposed on the network capability exposure platform in FIG. 5. The obtaining unit 701 is configured to support the video transmission apparatus 700 to perform S501. The processing unit 702 is configured to support the video transmission apparatus 700 to perform S503. The sending unit 703 is configured to support the video transmission apparatus 700 to perform S505.

Optionally, with reference to the system architecture shown in FIG. 6, the video transmission apparatus 700 shown in FIG. 12 is disposed on the network capability exposure platform in FIG. 6.

Optionally, with reference to the system architecture shown in FIG. 8, the video transmission apparatus 700 shown in FIG. 12 is disposed on the network capability exposure platform in FIG. 8.

Optionally, with reference to the system architecture shown in FIG. 10, the video transmission apparatus 700 shown in FIG. 12 is disposed on the network capability exposure platform in FIG. 10.

The apparatus embodiment described in FIG. 12 is merely an example. For example, division into the units is merely logical function division. During actual implementation, another division manner may be used. For example, a plurality of units or components may be combined or integrated into another system, or some features may be ignored or may not be performed. Functional units in embodiments of this application may be integrated in one processing unit, each of the units may exist alone physically, or two or more units may be integrated in one unit.

All or some of the units in the video transmission apparatus 700 are implemented by software, hardware, firmware, or any combination thereof.

Figure 14:
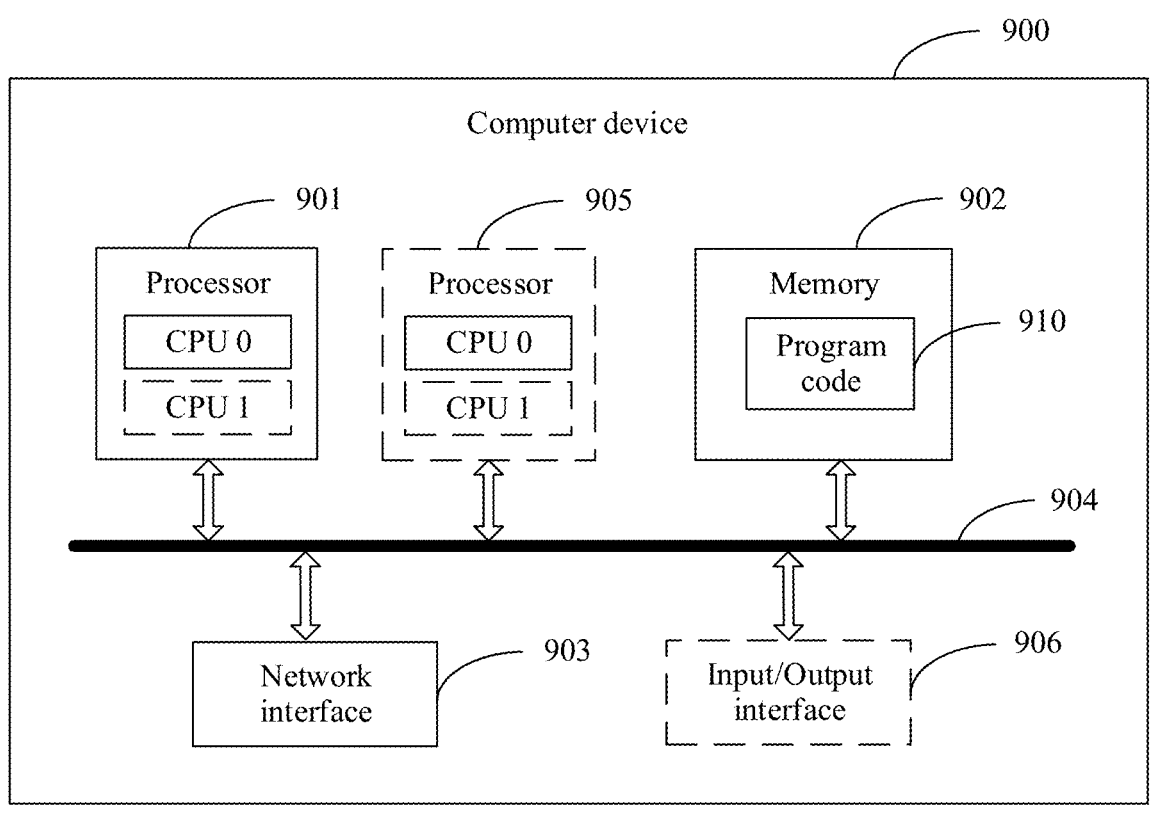
FIG. 14 is a schematic diagram of a structure of a computer device 900 according to an embodiment of this application.

When software is used for implementation, for example, the processing unit 702 is implemented by a software functional unit that is generated after at least one processor 901 in FIG. 14 reads program code stored in a memory 902.

When hardware is used for implementation, for example, the units in FIG. 12 are implemented by different hardware in a computer device, respectively. For example, the processing unit 702 is implemented by some processing resources (for example, one or two cores in a multi-core processor) in at least one processor 901 in FIG. 14, or implemented by a programmable device such as a field-programmable gate array (FPGA) or a coprocessor. The obtaining unit 701 and the sending unit 703 are implemented by a network interface 903 in FIG. 14.

Figure 13:
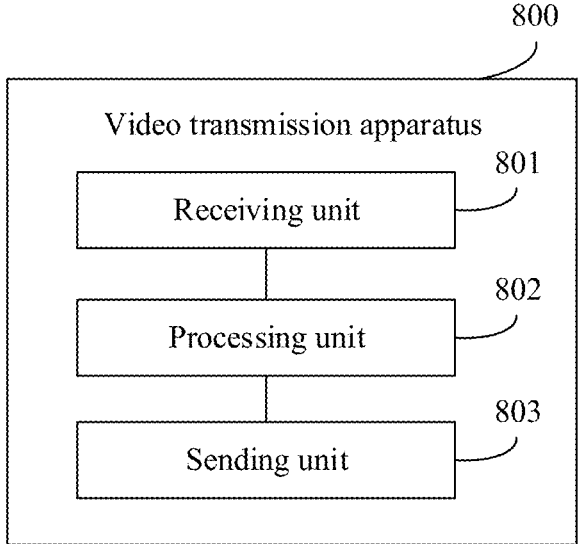
FIG. 13 is a schematic diagram of a structure of a video transmission apparatus 800 according to an embodiment of this application.

FIG. 13 is a schematic diagram of a structure of a video transmission apparatus 800 according to an embodiment of this application. The video transmission apparatus 800 shown in FIG. 13 includes a receiving unit 801, a processing unit 802, and a sending unit 803.

Optionally, with reference to the system architecture shown in FIG. 4, the video transmission apparatus 800 shown in FIG. 13 is disposed on the network capability exposure platform in FIG. 4.

Optionally, with reference to the method flow shown in FIG. 5, the video transmission apparatus 700 shown in FIG. 12 is disposed on the network capability exposure platform in FIG. 5. The receiving unit 801 is configured to support the video transmission apparatus 800 to perform S507. The processing unit 802 is configured to support the video transmission apparatus 800 to perform S509. The sending unit 803 is configured to support the video transmission apparatus 800 to perform S511.

Optionally, with reference to the system architecture shown in FIG. 6, the video transmission apparatus 800 shown in FIG. 13 is disposed on the network capability exposure platform in FIG. 6.

Optionally, with reference to the system architecture shown in FIG. 8, the video transmission apparatus 800 shown in FIG. 13 is disposed on the network capability exposure platform in FIG. 8.

Optionally, with reference to the system architecture shown in FIG. 10, the video transmission apparatus 800 shown in FIG. 13 is disposed on the network capability exposure platform in FIG. 10.

The apparatus embodiment described in FIG. 13 is merely an example. For example, division into the units is merely logical function division. During actual implementation, another division manner may be used. For example, a plurality of units or components may be combined or integrated into another system, or some features may be ignored or may not be performed. Functional units in embodiments of this application may be integrated in one processing unit, each of the units may exist alone physically, or two or more units may be integrated in one unit.

All or some of the units in the video transmission apparatus 800 are implemented by software, hardware, firmware, or any combination thereof.

When software is used for implementation, for example, the processing unit 802 is implemented by a software functional unit that is generated after at least one processor 901 in FIG. 14 reads program code stored in a memory 902.

When hardware is used for implementation, for example, the units in FIG. 13 are implemented by different hardware in a computer device, respectively. For example, the processing unit 802 is implemented by some processing resources (for example, one or two cores in a multi-core processor) in at least one processor 901 in FIG. 14, or implemented by a programmable device such as a field-programmable gate array (FPGA) or a coprocessor. The receiving unit 801 and the sending unit 803 are implemented by a network interface 903 in FIG. 14.

FIG. 14 is a schematic diagram of a structure of a computer device 900 according to an embodiment of this application. The computer device 900 includes at least one processor 901, a memory 902, and at least one network interface 903.

Optionally, with reference to the system architecture shown in FIG. 4, the computer device 900 shown in FIG. 14 is provided as a specific structure of the network capability exposure platform or the video capturing device management platform in FIG. 4.

Optionally, with reference to FIG. 5, the computer device 900 shown in FIG. 14 is configured to perform the steps that are performed by the network capability exposure platform in the method flow shown in FIG. 5. The network interface 903 is configured to perform S501. The processor 901 is configured to perform S503 and indicates the network interface 903 to perform S505.

Alternatively, the computer device 900 shown in FIG. 14 is configured to perform the steps that are performed by the video capturing device management platform in the method flow shown in FIG. 5. The network interface 903 is configured to perform S507. The processor 901 is configured to perform S509 and indicates the network interface 903 to perform S511.

Optionally, with reference to the system architecture shown in FIG. 6, the computer device 900 shown in FIG. 14 is provided as a specific structure of the network capability exposure platform in FIG. 6.

Optionally, with reference to the system architecture shown in FIG. 8, the computer device 900 shown in FIG. 14 is provided as a specific structure of the network capability exposure platform in FIG. 8.

Optionally, with reference to the system architecture shown in FIG. 9, the computer device 900 shown in FIG. 14 is provided as a specific structure of the network capability exposure platform in FIG. 9.

Optionally, with reference to the system architecture shown in FIG. 10, the computer device 900 shown in FIG. 14 is provided as a specific structure of the network capability exposure platform in FIG. 10.

The processor 901 is, for example, a general-purpose central processing unit (CPU), a network processor (NP), a graphics processing unit (GPU), neural-network processing units (NPU), a data processing unit (DPU), a microprocessor, or one or more integrated circuits configured to implement the solutions in this application. For example, the processor 901 includes an application-specific integrated circuit (ASIC), a programmable logic device (PLD), or a combination thereof. The PLD is, for example, a complex programmable logic device (CPLD), a field-programmable logic gate array (FPGA), generic array logic (GAL), or any combination thereof.

The memory 902 is, for example, a read-only memory (ROM) or another type of static storage device capable of storing static information and instructions, or a random access memory (RAM) or another type of dynamic storage device capable of storing information and instructions, or is an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium capable of carrying or storing expected program code in a form of instructions or a data structure and capable of being accessed by a computer. However, the memory 902 is not limited thereto. Optionally, the memory 902 exists independently and is connected to the processor 901 by an internal connection 904. Alternatively, the memory 902 is optionally integrated with the processor 901.

The network interface 903 uses any apparatus such as a transceiver, and is configured to communicate with another device or a communication network. The network interface 903 includes, for example, at least one of a wired network interface or a wireless network interface. The wired network interface is, for example, an Ethernet interface. The Ethernet interface is, for example, an optical interface, an electrical interface, or a combination thereof. The wireless network interface is, for example, a wireless local area network (WLAN) interface, a cellular network interface, or a combination thereof.

In some embodiments, the processor 901 includes one or more CPUs, such as a CPU 0 and a CPU 1 shown in FIG. 14.

In some embodiments, the computer device 900 optionally includes a plurality of processors, such as the processor 901 and a processor 905 shown in FIG. 14. Each of these processors is, for example, a single-core (single-CPU) processor or a multi-core (multi-CPU) processor. The processor herein is optionally one or more devices, circuits, and/or processing cores configured to process data (for example, computer program instructions).

In some embodiments, the computer device 900 further includes the internal connection 904. The processor 901, the memory 902, and the at least one network interface 903 are connected by the internal connection 904. The internal connection 904 includes a pathway, for transferring information between the foregoing components. Optionally, the internal connection 904 is a board or bus. Optionally, the internal connection 904 is classified into an address bus, a data bus, a control bus, and the like.

In some embodiments, the computer device 900 further includes an input/output interface 906. The input/output interface 906 is connected to the internal connection 904.

Optionally, the processor 901 implements the method in the foregoing embodiment by reading program code 910 stored in the memory 902, or the processor 901 implements the method in the foregoing embodiment by reading internally stored program code. When the processor 901 implements the method in the foregoing embodiment by reading the program code 910 stored in the memory 902, the memory 902 stores program code that implements the method provided in embodiments of this application.

For more details about the processor 901 implementing the foregoing functions, refer to descriptions in the foregoing method embodiments. Details are not described herein again.

Embodiments in this specification are all described in a progressive manner. For parts that are the same or similar in the embodiments, reference may be made to each other. A part described in detail in each embodiment is a difference between the embodiment and other embodiments.

Making reference to B for A means that A is the same as B or that A is a simple variant of B.

In the specification and claims of embodiments of this application, the terms "first", "second", and the like are used to distinguish between different objects rather than to describe a particular order of the objects, and shall not be understood as an indication or implication of relative importance. For example, a first video and a second video are used to distinguish between different videos rather than to describe a particular order of the videos, and shall not be understood as that the first video is more important than the second video.

In embodiments of this application, "at least one" means one or more, and "a plurality of" means two or more, unless otherwise specified. For example, a plurality of videos mean two or more videos.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions described in embodiments of this application are generated. The computer may be a general-purpose computer, a dedicated computer, a computer network, or another programmable apparatus. The computer instructions may be stored in a computer-readable storage medium or may be transmitted from a computer-readable storage medium to another. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing embodiments are merely intended for describing the technical solutions of this application other than limiting the technical solutions of this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A video transmission method implemented by a computer device, comprising:
    obtaining first positions of I-frames of a plurality of videos in a first cell of a wireless communication system;
    performing arrangement based on the first positions of the I-frames of the plurality of videos, to obtain second positions of the I-frames of the plurality of videos, wherein a distance between second positions of I-frames of adjacent videos of the plurality of videos is greater than or equal to an I-frame tolerable transmission duration, and wherein the I-frame tolerable transmission duration is a maximum latency for which the wireless communication system is allowed to transmit an I-frame of a video; and
    sending indication information to a video capturing device management platform, wherein the indication information indicates to adjust a position of an I-frame of a first video of the plurality of videos from a first position of the I-frame of the first video to a second position of the I-frame of the first video, and the first position of the I-frame of the first video is different from the second position of the I-frame of the first video.

2. The method according to claim 1, wherein
    the plurality of videos are all uplink videos in the first cell; or
    the plurality of videos are all downlink videos in the first cell.

3. The method according to claim 1, wherein the obtaining first positions of I-frames of the plurality of videos in the first cell comprises:

receiving the first positions of the I-frames of the plurality of videos from a terminal-side device or a system device.

4. The method according to claim 1, wherein the obtaining first positions of I-frames of the plurality of videos in the first cell comprises:
    recognizing the first positions of the I-frames of the plurality of videos based on traffic characteristics of the plurality of videos.

5. The method according to claim 1, wherein the indication information comprises an amount of adjustment that is for the position of the I-frame of the first video.

6. The method according to claim 5, wherein the amount of adjustment is related to a total quantity of videos borne by the first cell.

7. The method according to claim 1, wherein the indication information comprises an adjustment amount range corresponding to an amount of adjustment that is for the position of the I-frame of the first video.

8. The method according to claim 7, wherein the indication information further comprises the first position of the I-frame of the first video.

9. The method according to claim 1, wherein the performing arrangement based on the first positions of the I-frames of the plurality of videos, to obtain second positions of the I-frames of the plurality of videos comprises:
    determining a second position of an I-frame of a second video of the plurality of videos in an uplink direction based on a second position of the I-frame of the first video in the uplink direction, wherein a distance between the second position of the I-frame of the first video in the uplink direction and the second position of the I-frame of the second video in the uplink direction meets a condition; and
    determining a second position of the I-frame of the second video in a downlink direction based on the second position of the I-frame of the second video in the uplink direction and a second position of an I-frame of a third video in the downlink direction, wherein the second position of the I-frame of the second video in the uplink direction and the second position of the I-frame of the third video in the downlink direction meet the condition, and
    wherein the first video and the second video are both uplink videos in the first cell, the second video and the third video are both downlink videos in a second cell, and the second cell is a cell different from or the same as the first cell.

10. The method according to claim 1, wherein before the performing arrangement based on the first positions of the I-frames of the plurality of videos, to obtain second positions of the I-frames of the plurality of videos, the method further comprises:
    determining the plurality of videos in the first cell from videos in a plurality of radio cells based on correspondences between radio cells and videos.

11. A video transmission method implemented by a coding device for a video capturing device management platform, comprising:
    receiving indication information, wherein the indication information indicates to adjust a position of an I-frame of a first video of a plurality of videos from a first position of the I-frame of the first video to a second position of the I-frame of the first video, and the first position of the I-frame of the first video is different from the second position of the I-frame of the first video;

obtaining, based on the indication information, an amount of adjustment that is for the position of the I-frame of the first video, wherein the amount of adjustment for the position of the I-frame is related to an I-frame tolerable transmission duration of the first video, and wherein the I-frame tolerable transmission duration is a maximum latency for which a wireless communication system is allowed to transmit an I-frame of a video; and sending an adjustment command to a video capturing device, wherein the video capturing device is a data source of the first video, and the adjustment command instructs to adjust the position of the I-frame of the first video from the first position to the second position.

12. The method according to claim 11, wherein the obtaining, based on the indication information, the amount of adjustment that is for the position of the I-frame of the first video comprises:

obtaining the amount of adjustment that is for the position of the I-frame of the first video and that is carried in the indication information; or obtaining an adjustment amount range that corresponds to the amount of adjustment and that is carried in the indication information, wherein the amount of adjustment is for the position of the I-frame of the first video; and determining, based on the adjustment amount range and the first position of the I-frame of the first video, the amount of adjustment that is for the position of the I-frame of the first video.

13. A computer device, comprising:

a memory storing computer programming instructions; and one or more processors coupled to the memory and configured to execute the computer programming instructions to cause the computer device to perform steps of:

obtaining first positions of I-frames of a plurality of videos in a first cell of a wireless communication system;

performing arrangement based on the first positions of the I-frames of the plurality of videos, to obtain second positions of the I-frames of the plurality of videos, wherein a distance between second positions of I-frames of adjacent videos of the plurality of videos is greater than or equal to an I-frame tolerable transmission duration, and wherein the I-frame tolerable transmission duration is a maximum latency for which the wireless communication system is allowed to transmit an I-frame of a video; and sending indication information to a video capturing device management platform, wherein the indication information indicates to adjust a position of an I-frame of a first video of the plurality of videos from a first position of the I-frame of the first video to a second position of the I-frame of the first video, and the first position of the I-frame of the first video is different from the second position of the I-frame of the first video.

14. The computer device according to claim 13, wherein the plurality of videos are all uplink videos in the first cell; or the plurality of videos are all downlink videos in the first cell.

15. The computer device according to claim 13, wherein the indication information comprises an amount of adjustment that is for the position of the I-frame of the first video.

16. The computer device according to claim 15, wherein the amount of adjustment is related to a total quantity of videos borne by the first cell.

17. The computer device according to claim 13, wherein the indication information comprises an adjustment amount range corresponding to an amount of adjustment that is for the position of the I-frame of the first video.

18. The computer device according to claim 17, wherein the indication information further comprises the first position of the I-frame of the first video.

* * * * *